United States Patent [19]

Matsuo

[11] 3,804,985

[45] Apr. 16, 1974

[54] PHASE-DIFFERENCE-MODULATION COMMUNICATION SYSTEM

[75] Inventor: Yoshio Matsuo, Tokyo, Japan

[73] Assignee: Nikkon Electric Company, Limited, Tokyo, Japan

[22] Filed: June 18, 1971

[21] Appl. No.: 154,583

[30] Foreign Application Priority Data

June 18, 1970 Japan ............................ 45-53245
June 18, 1970 Japan ............................ 45-53246
July 23, 1970 Japan ............................ 45-64838

[52] U.S. Cl. .......... 179/15 BS, 178/69.5 R, 325/47
[51] Int. Cl. .......................................... H04j 3/06
[58] Field of Search ........... 178/69.5 R; 179/15 BS, 179/15 BM; 325/47, 39, 40

[56] References Cited

UNITED STATES PATENTS

| | | | |
|---|---|---|---|
| 3,579,110 | 5/1971 | Hauber | 179/15 BM |
| 3,603,882 | 9/1971 | Wilson | 325/47 |

*Primary Examiner*—Ralph D. Blakeslee
*Attorney, Agent, or Firm*—Sughrue, Rothwell, Mion, Zinn & Macpeak

[57] ABSTRACT

A frame synchronization technique for a phase-difference modulation communication system. A carrier wave is phase-difference modulated in accordance with information signals emanating from a plurality of information channels and subsequently time-division multiplexed into a series of time frames. The time-division multiplexed signal is then stepwise phase difference modulated to provide a stepwise shift at a rate corresponding to the length of a time frame. This stepwise phase shift defines each time frame. In this manner frame synchronization can be accomplished without the use of additional frame synchronization pulses.

15 Claims, 25 Drawing Figures

PHASE-DIFFERENCE-MODULATION COMMUNICATION SYSTEM

This invention relates to a digital communication system employing the so-called phase difference modulation adapted to a superhighspeed digital communication.

A digital communication system constituted by a number of pulse regenerative repeaters is capable of transmitting a great amount of information over a long distance without considerably deteriorating the transmission performance. With the increasing demand for communications, transmission speed demand for the digital communication systems have become higher and higher. Under the circumstances, various high speed communication systems using high frequency carrier waves extending to the millimeter wave region are being proposed, taking advantage of wideband transmission capability of the millimeter waves. In such proposed systems, the use of phase modulation is considered advantageous because the desirable noise resistant property can be maintained and multilevel transmission can be relatively easily realized. In the phase modulation, however, it is difficult on the receiver side to discriminate the absolute value of the phase of the carrier wave in each time slot. To solve this problem, the so-called phase difference modulation has been proposed in which the information signal to be transmitted is translated into the quantity of the phase change between every two sequence pulses. A general description of the phase difference modulation is given, for example, in the Bell Laboratories Record, May 1965 issue, pages 175 to 180 and U.S. Pat. application Ser. No. 49,544 filed on Aug. 15, 1960, whose corresponding Japanese application was published on June 1, 1964 under the Japanese Pat. No. 9205/64.

For phase difference modulation, a logic conversion circuit is needed, consisting of logic circuits having binary counters. In other words, high speed logic circuits are needed for high speed digital communications. Practically, however, the limiting factor for the transmission speed or the clock frequency lies not in the bandwidth or in the response characteristics of the circuit elements but in the operating speed of the logic circuit, especially of the binary counter. Hence, if a communication system operable at a higher speed than the operating speed of the binary counter be realized, then it is possible to increase the speed of digital communication.

On the other hand, when viewed from the manufacturing cost and stability, to provide the speed of digital communication system now in use by the lower speed logic circuit than presently employed ones is favorable.

More specifically, in a high speed digital communication system in general, the transmission signal is multiplexed in the time division fashion. For the channel separation of the time-division multiplexed signal, the frame synchronizing signal is indispensable. In those conventional systems, however, the additional bits for the frame synchronizing purpose are needed. Since the frame synchronization signal is added in the form of a pulse train the detecting circuit therefore tends to be complicated. Such difficulty will be solved, if the high speed digital communication system is put in practical use without relying on such additional frame synchronizing pulses. It is also to be noted that the frame synchronization is not even suggested in the system proposed in the above-mentioned U.S. Pat. application.

It is therefore an object of this invention to provide a phase difference modulation communication system adapted to time division multiplexing with a simple combination of constituent elements.

According to the present invention, there is provided a time division multiplexed phase difference modulation communication system in which a stepwise phase difference modultion is duplicatively applied to a once-phase-difference modulated carrier wave so as to define every frame extending over a predetermined number of time slots. In the most simplified mode of operation, the amount of each phase shift given by the duplicative phase difference modulation is $\pi/n$ radian, where $n$ stands for the number of phases to be multiplexed and included in each frame.

In the present phase difference modulation communication system the frame synchronizing information is always retained in the pulse signal even after being transmitted. This is due to the phase change caused by the duplicative phase difference modulation. In this phase difference modulation, therefore, the synchronizing signal is unfailingly extracted even when the degree of multiplexing is very high. Also, this type of duplicative phase difference eliminates the need for high speed logic circuitry to be employed in a transmitter, a receiver, and/or a repeater.

The invention will now be described in conjunction with the accompanying drawings wherein.

Figure 5:
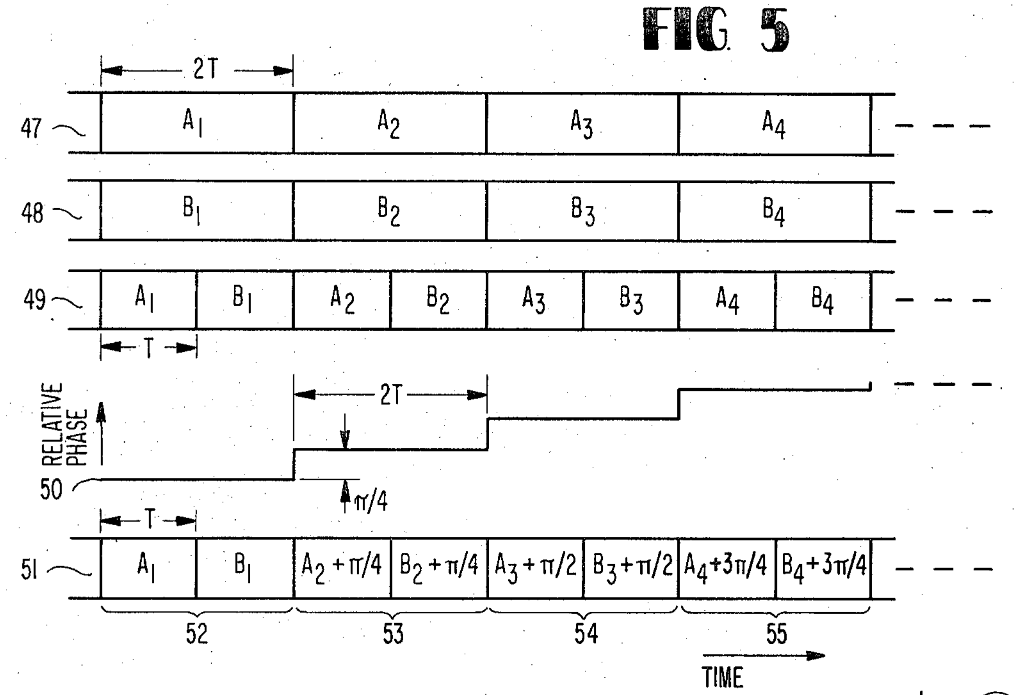
FIG. 5 is a waveform diagram illustrating the operation of the transmitter shown in FIG. 1.
Figure 7:
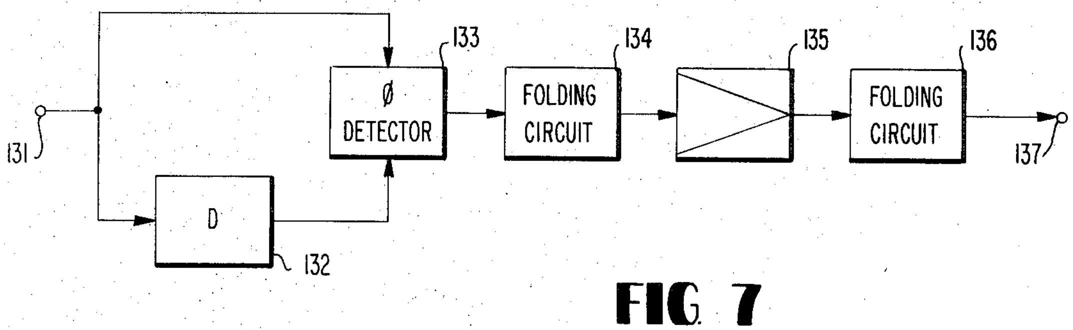
FIG. 7 is a block diagram showing a clock signal extracting circuit employed in a receiver of the system of this invention.
Figure 8:
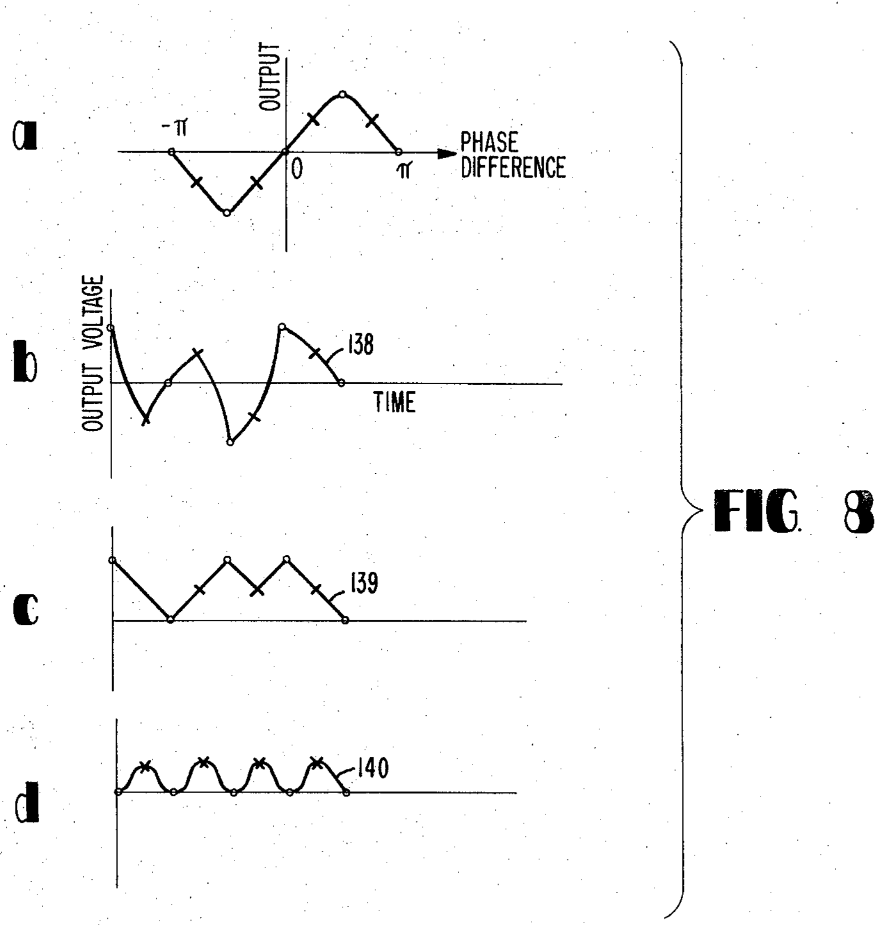
Figure 9:
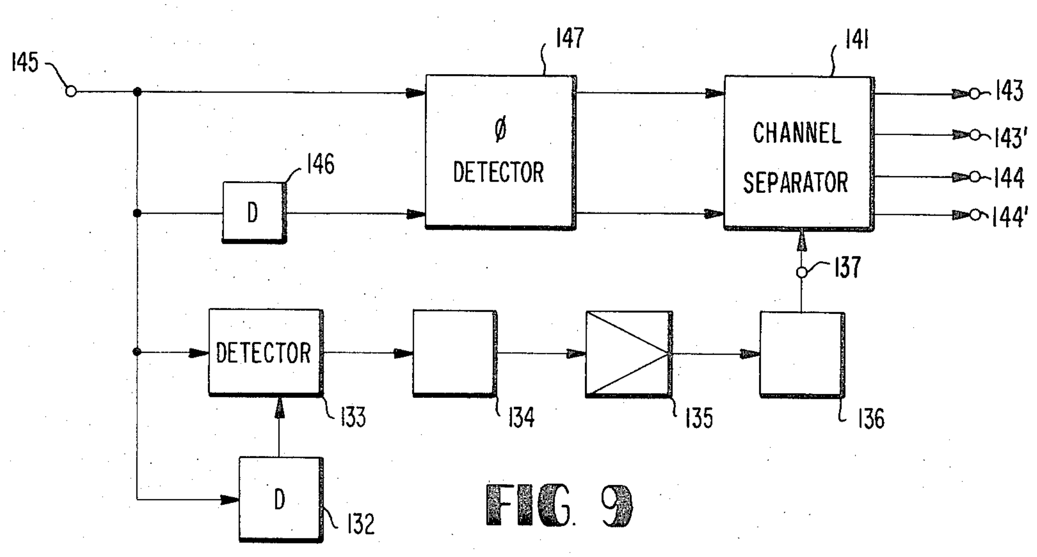
Figure 10:
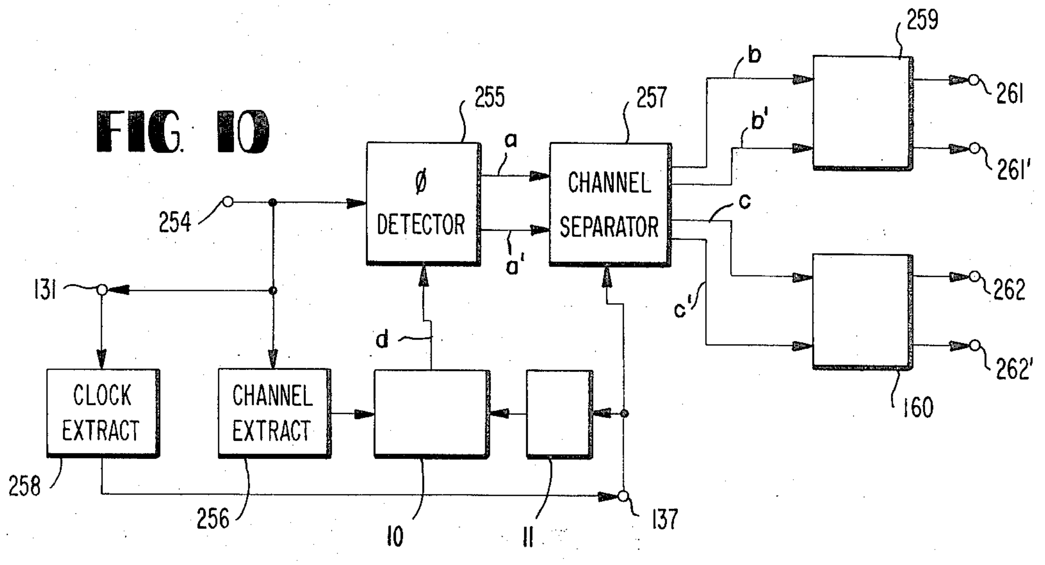
Figure 11:
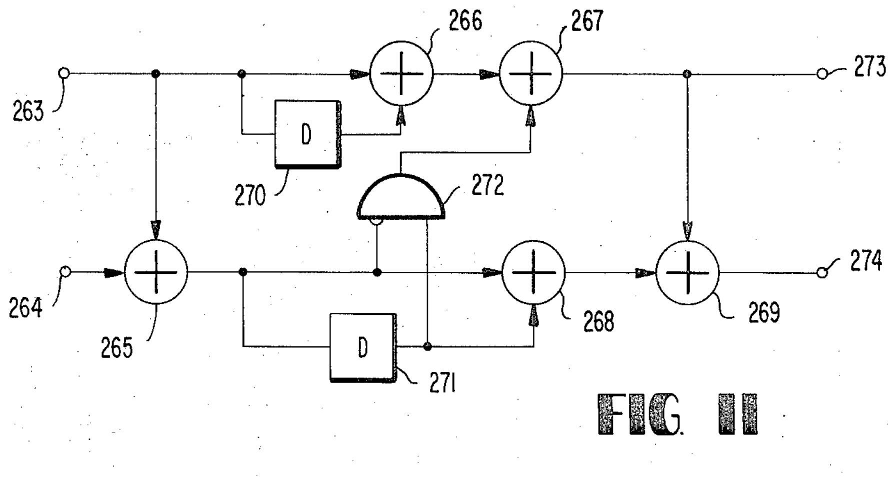
Figure 12:
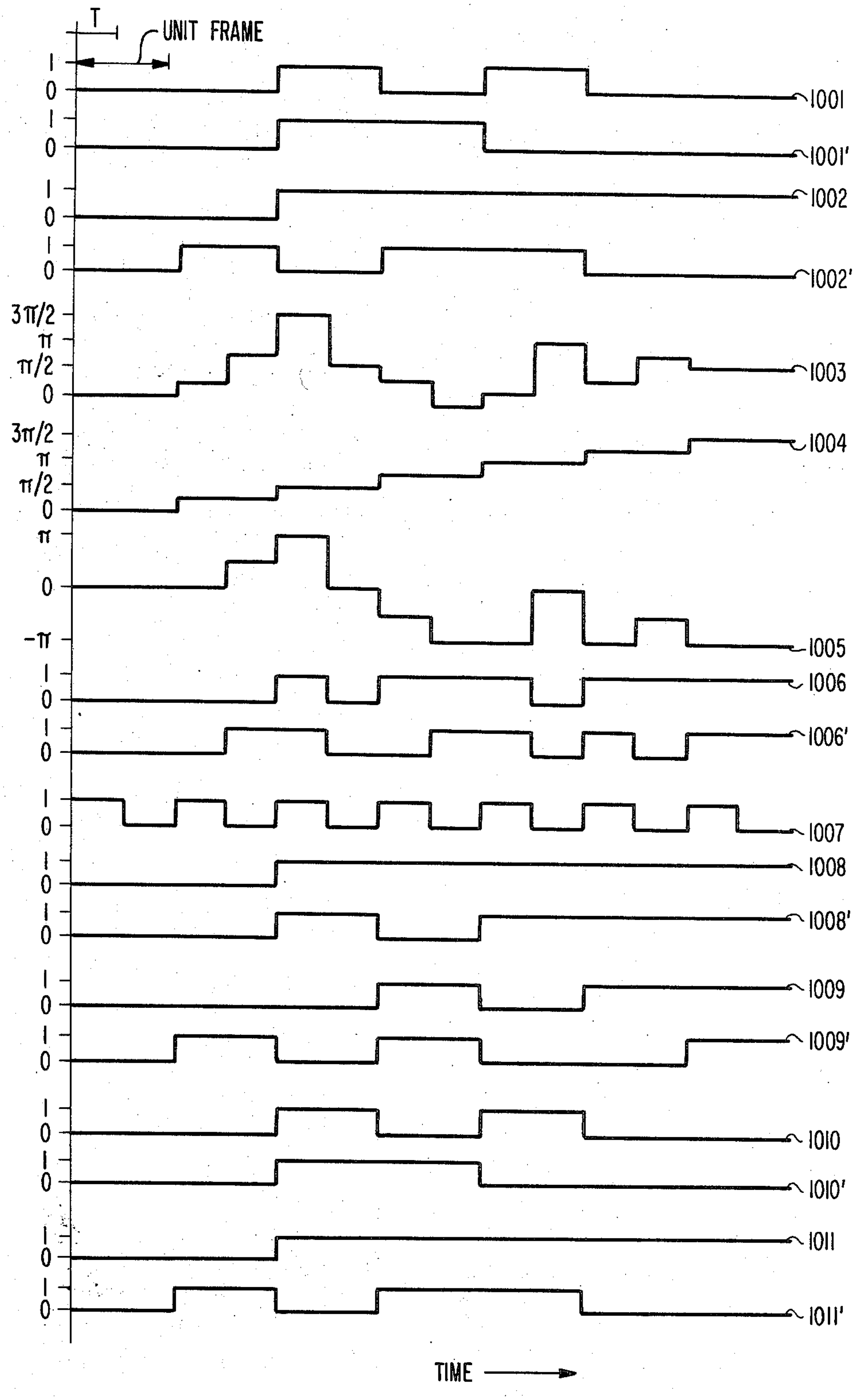
Figure 13:
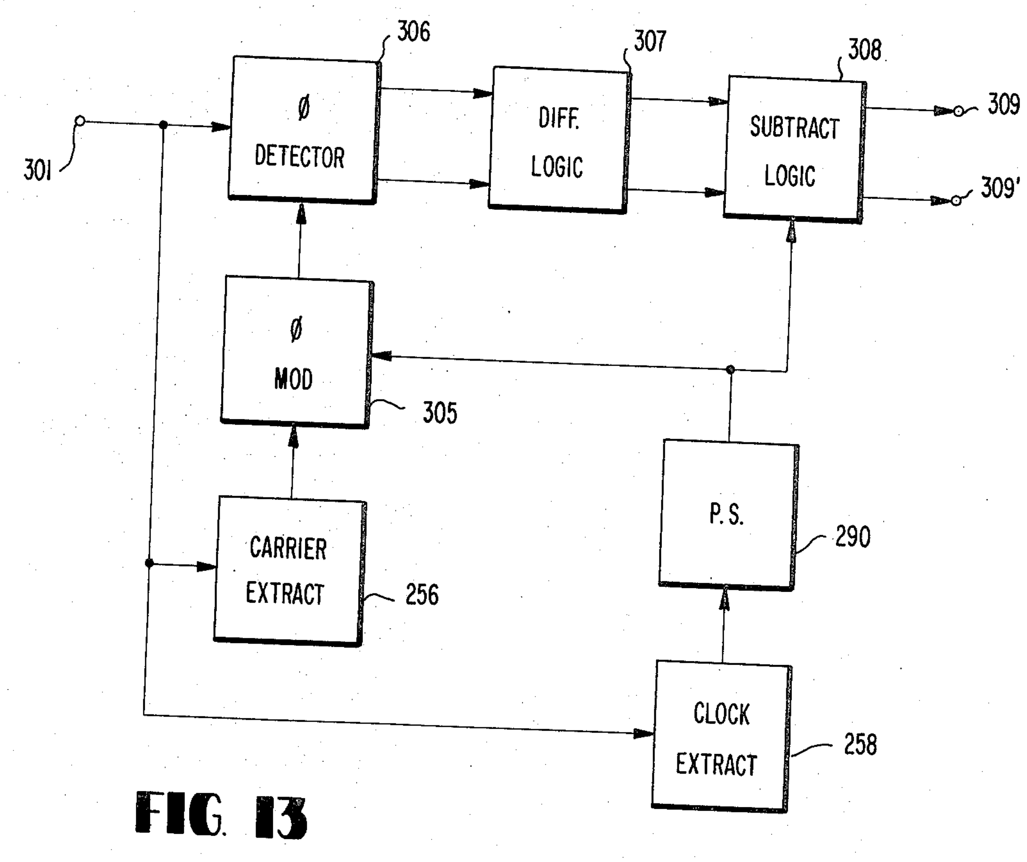
Figure 14:
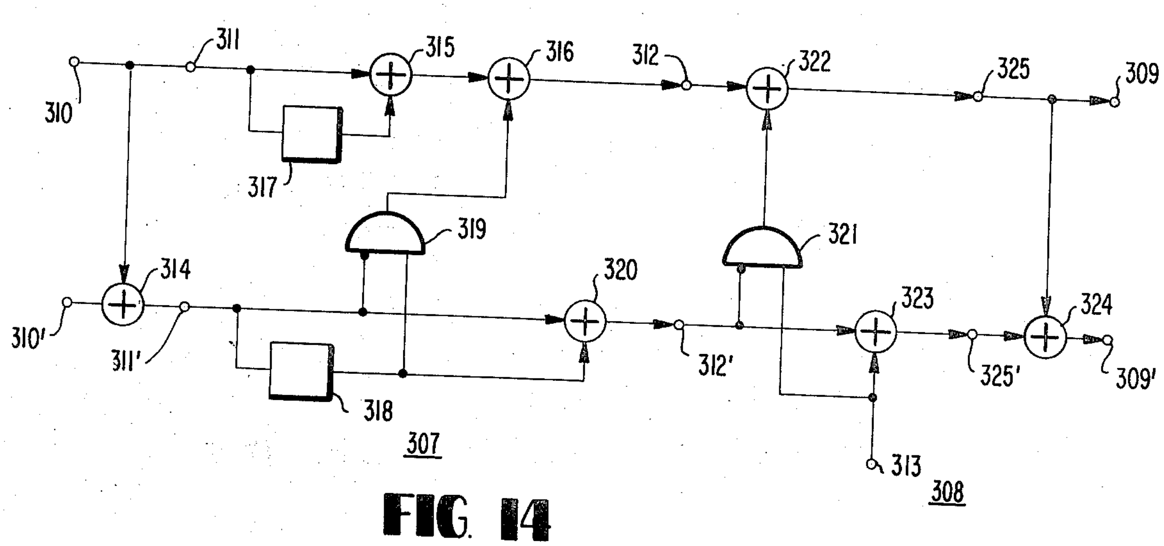
Figure 16:
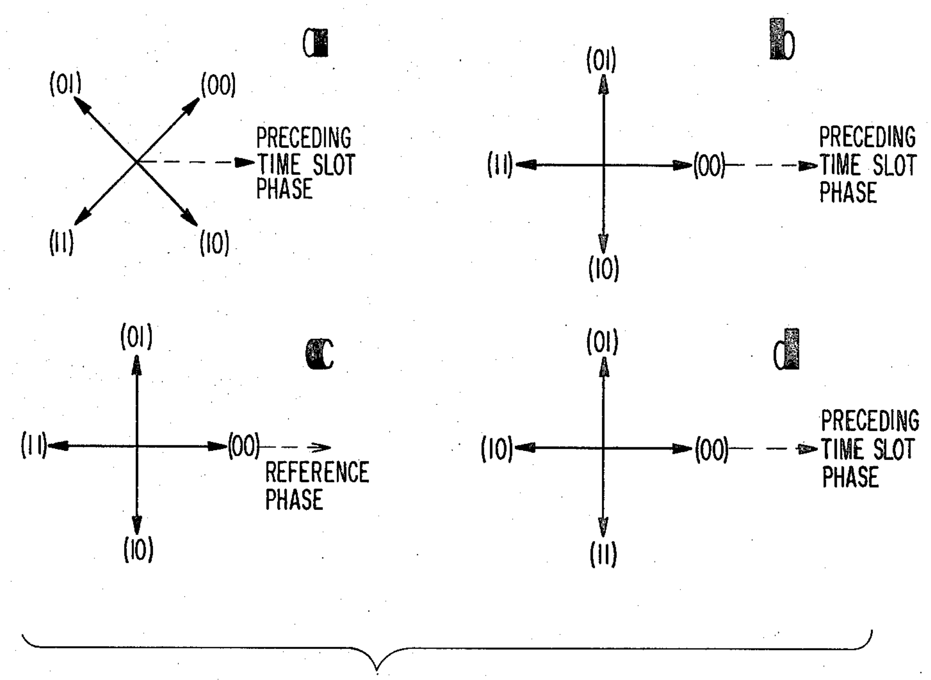
Figure 18:
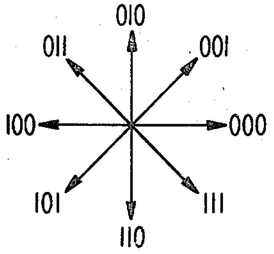
Figure 17:
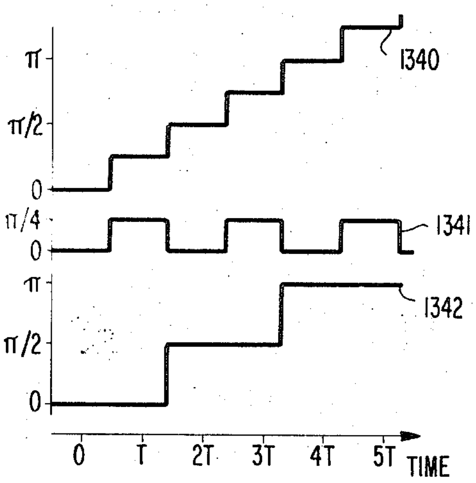
Figure 19:
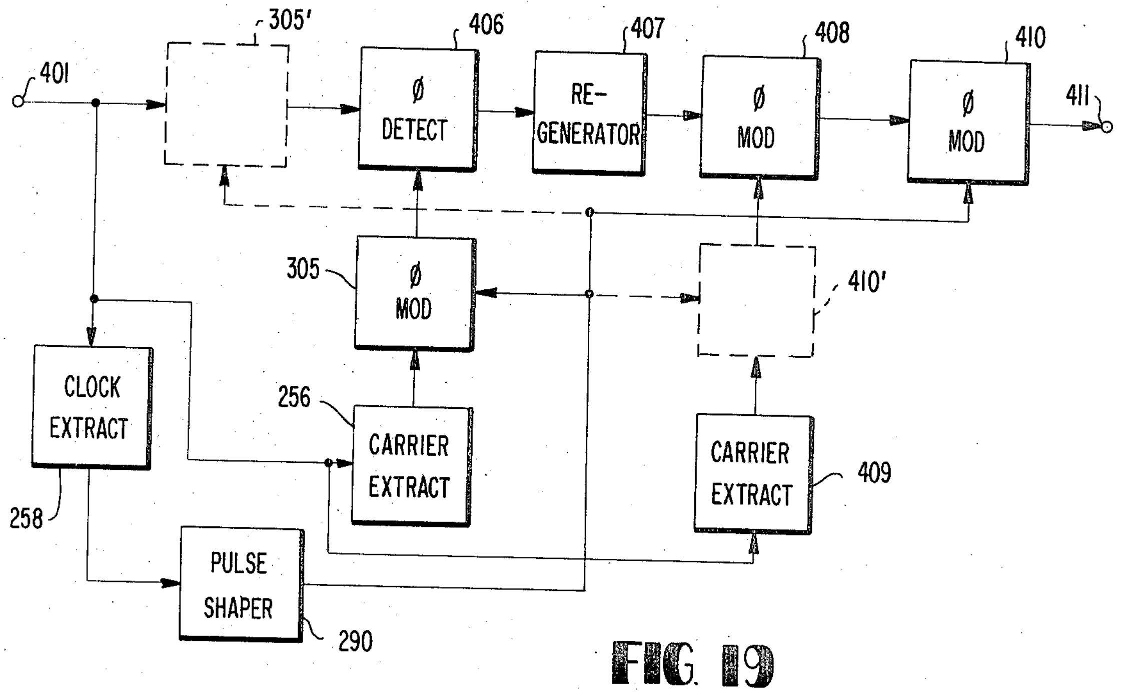
Figure 20:
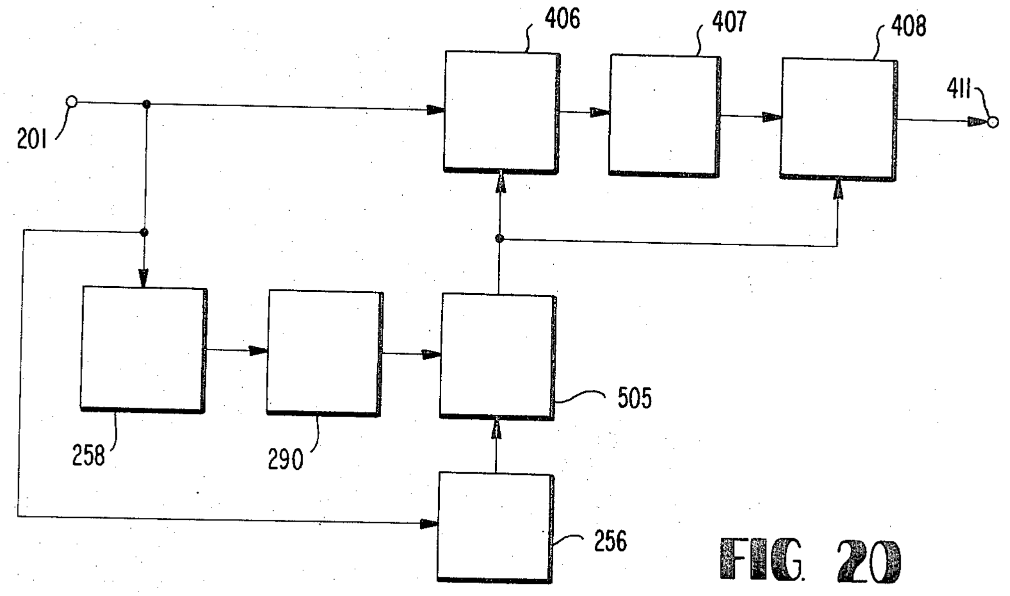

FIGS. 8 *a*, *b*, *c* and *d* show characteristic curves and waveform diagram for explaining the operation of the clock signal extracting circuit of FIG. 7;

FIG. 9 is a block diagram showing a receiver adapted to receive and reproduce the multiplexed phase difference modulated signal transmitted from the transmitter;

FIG. 10 shows in blocks another example of receivers adapted to receive and reproduce the multiplexed signals transmitted from the transmitter;

FIG. 11 shows a circuit diagram of a logic circuit to be used in the receiver of FIG. 10;

FIG. 12 shows a waveform diagram for explaining the operation of the receiver of FIG. 10;

FIG. 13 shows in blocks another example of receivers adapted to receive and reproduce the multiplexed signals transmitted from the transmitter;

FIG. 14 shows a circuit diagram of the principal part of the receiver of FIG. 13;

FIG. 5 shows a waveform diagram for explaining the operation of the receiver of FIG. 14;

FIG. 16 shows the relationship between the dibits and the various phases corresponding to the dibits;

FIG. 17 shows the phase shift vs. time relationship taken by the duplicative phase modulation applied for the frame synchronization purpose;

FIG. 18 shows the relationship between the various phases and the binary code to be represented by the phase difference modulation;

FIG. 19 shows in blocks an example of a repeater to be inserted in a transmission line linking the transmitter and the receiver;

FIG. 20 shows in blocks another example of similar repeaters; and

Figure 21:
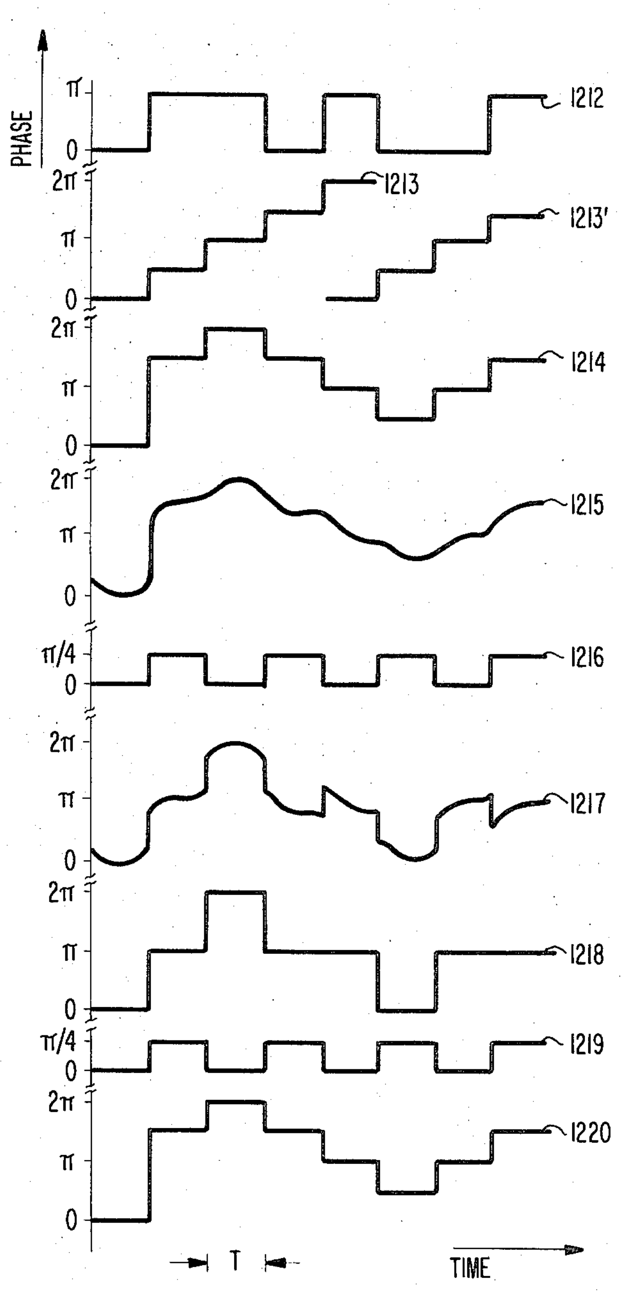
Figure 22:
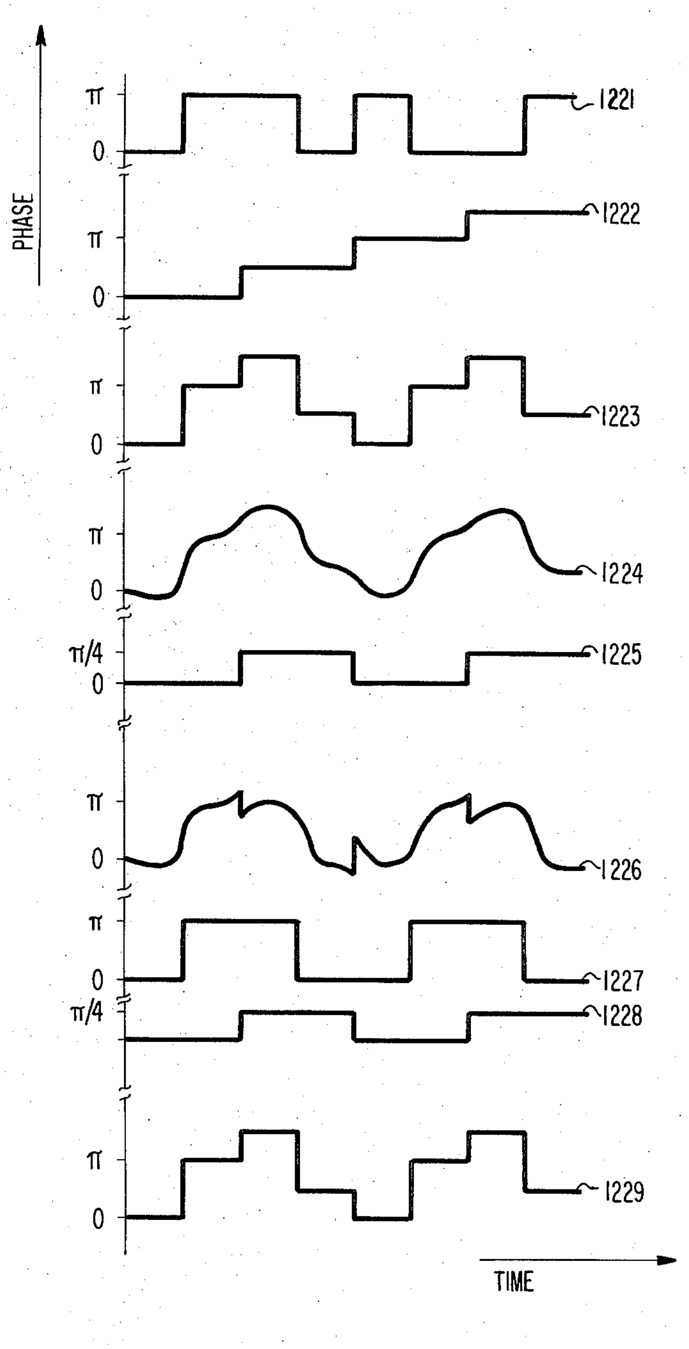

FIGS. 21 and 22 show waveform diagrams for explaining the operation of the repeater of FIGS. 20 and 21, respectively.

For the simplicity of description, it is assumed, unless specifically mentioned to the contrary, that the number of both the information sources and the binary digits are two (i.e., two bits parallel, that is the so-called dibit; $M = 2$ and $n = 4$, where $n$ represents the kinds of phase taken in the present phase difference modulation and $M$ denotes the number of channels to be multiplexed).

Figures 1, 2:
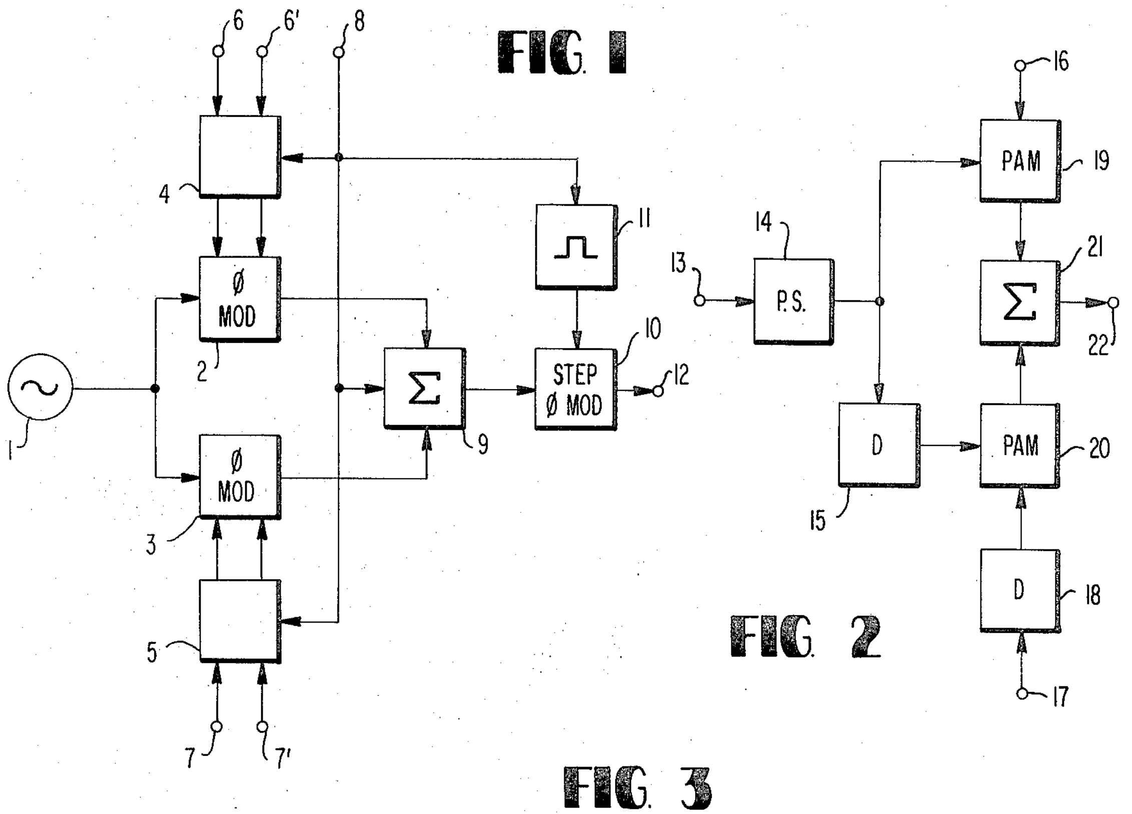
FIG. 1 is a block diagram showing a transmittter of the phase-difference-modulation system of this invention.
FIG. 2 is a block diagram showing an example of a multiplexing circuit used in the transmitter shown in FIG. 1.

Referring to FIG. 1, the reference numeral 1 denotes a carrier wave source; 2 and 3, four-phase phase modulating circuits operating at a clock frequency of $f_o/2$; 4 and 5 logic circuits operating at the clock frequency $f_o/2$ for the phase difference modulation; 6, 6' and 7, 7'; input terminals for respectively receiving dibit information signals from information signal sources A and B (not shown) each having clock frequency $f_o/2$ (The information signals supplied from the sources A and B will be hereunder referred to as channel A and B signals, respectively, and likewise, the input and output terminals of these information signals as channel A terminal and channel B terminal, respectively); 8, an input terminal for clock signal of frequency $f_o/2$; 9, a multiplexing circuit operating in a carrier frequency band in which the signals from said modulating circuits 2 and 3 are multiplexed with the clock signal supplied from the terminal 8 and converted into a pulse signal having the clock frequency repetition frequency $f_o$; 10, a stepwise phase modulating circuit; 11, a logic circuit for generating pulses to drive said stepwise phase modulating circuit 10, and 12, an output terminal for the modulated signal. Before the operation of this transmitter is detailed, actual example of each of the elements thereof will be described hereunder.

Referring to FIG. 2, there is shown in blocks a well-known construction of the multiplexing circuit 9. In the drawing the reference numeral 13 denotes a clock pulse input terminal coupled to terminal 8 (FIG. 1); 14, a pulse shaping circuit responsive to the clock pulse for generating a square pulse having width T and repetition frequency $f_o/2$; 15 and 18, delay lines with delay time T; 16 and 17, input terminals for modulated waves supplied from the phase modulating circuits 2 and 3 (FIG. 1); and 18 and 20, pulse amplitude modulating circuits in which the input signals from the terminals 16 and 17 are gated under the control of the pulse having width T. The outputs of the two modulating circuits 19 and 20 are combined by summing circuit 21 and supplied to the output terminal 22 which is connected to stepwise phase modulating circuit 10 (FIG. 1). The phase-modulated signals from the terminals 16 and 17 do not appear simultaneously at the terminal 22 due to the delay lines 15 and 18. Thus, a time-division multiplexed signal produced at clock frequency $f_o$ from a plurality of signals supplied at the terminals 16 and 17 is obtained at the terminal 22.

Figure 3:
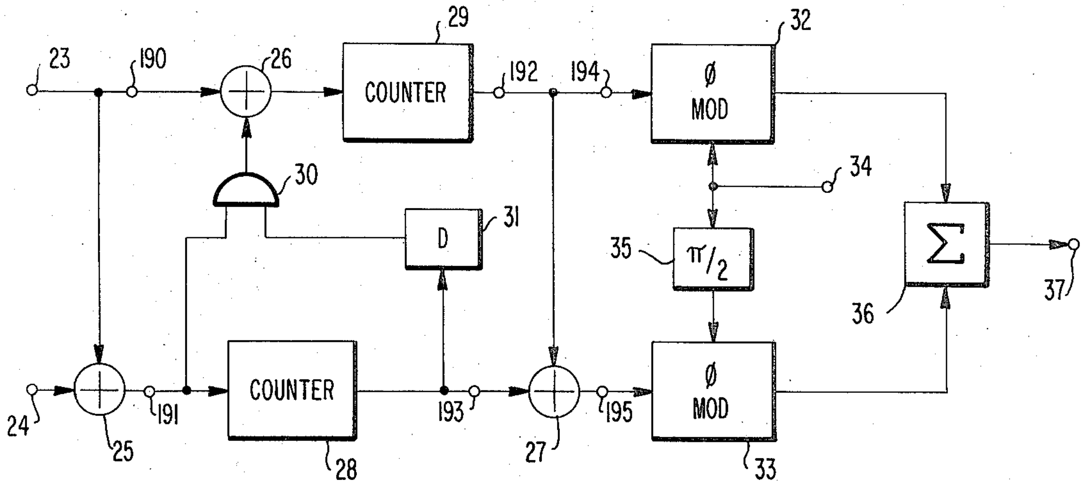
FIG. 3 is a block diagram showing a four-phase modulation circuit used in the transmitter shown in FIG. 1.

FIG. 3 shows a known practical example of the combination of a four-phase phase difference modulating circuit consisting of a phase logic conversion circuit 4 (FIG. 1) and a four-phase phase modulating circuit 2 (FIG. 1) (or of a logic conversion circuit 5 (FIG. 1) and a four-phase phase modulating circuit 3 (FIG. 1)). As is apparent, the block diagram of FIG. 3 corresponds to FIGS. 6 and 7 of the above-mentioned U.S. Pat. application. In FIG. 3, the reference numerals 23 and 24 (corresponding to channel A terminals 6 and 6') denote input terminals of dibit input A (It is assumed hereunder that the block diagram of FIG. 3 corresponds to the combination of blocks 4 and 2 of FIG. 1). In this combination, the information signals from the channel A and B terminals are assumed to be formed of two independent dibit signals. Therefore, in the phase logic circuit 4, it is necessary to process the dibits in two separate signal paths beginning respectively with the terminals 23 and 24. The reference numerals 25, 26 and 27 denote EXCLUSIVE OR circuits; 28 and 29, binary counters operating at clock frequency $f_o/2$; 30, an AND circuit; and 31, a delay circuit with delay time 2T. The binary counters 28 and 29 are supplied with a clock signal of the frequency $f_o/2$ (the circuit for the clock signal not shown). In this phase logic circuit 4, the wiring between terminals 23–24 and 190–191; and another wiring between 192–193 and 194–195, respectively comprising EXCLUSIVE OR circuits 25 and 27 are for converting a Gray binary code or a reflected binary code into a conventional binary code and vice versa. The circuit comprising the binary counters 28 and 29 lying between terminals 190–191 and 192–193 may be composed of a conventional binary code full adder circuit. In the phase logic circuit 4 as a whole, the full summation of Gray binary codes is performed. The operation of this logic circuit has been described above assuming that the Gray binary code is employed which shows distinctive characteristic against error as will be described later. In the part of phase modulating circuit 2, reference numerals 32 and 33 indicate two-phase modulating circuit, each taking 0-phase and $\pi$-phase under the control of the output of the logic circuit 4; 34, a carrier input terminal coupled to carrier wave source 1 of FIG. 1; 35, a $\pi/2$ phase shifter; 36, a summing circuit; and 37, an output terminal corresponding to terminal 16 of FIG. 2. The circuit elements 32, 33, 35 and 36 constitute a conventional four-phase phase modulating circuit. This four-phase phase difference modulating circuit is caused to deliver an output signal at phase 0, $+\pi/2$; $+\pi$, and $-\pi/2$ when the input codes at the terminals 23 and 24 are of Gray binary codes (0,0), (0,1), (1,1) and 1,0), respectively. As shown above, the dibit from channel A terminals 6 and 6' is expressed by (0,0), (0,1), (1,1) and (1,0).

Figure 4:
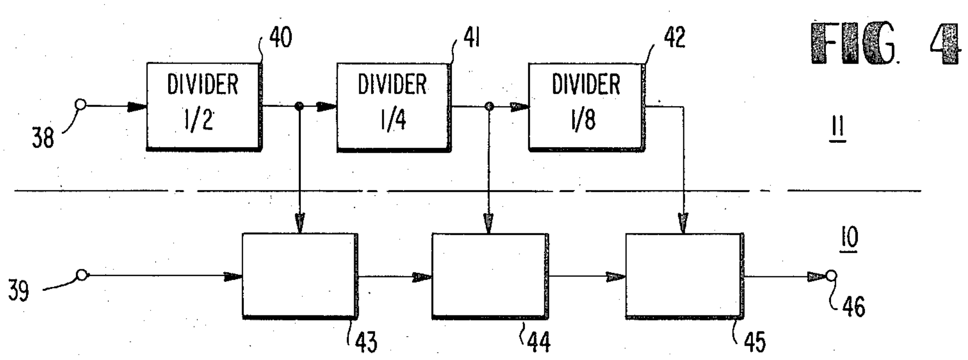
FIG. 4 is a block diagram showing a stepwise phase modulation circuit used in the transmitter shown in FIG. 1.

FIG. 4 shows in blocks the details of the stepwise phase modulation circuit 10 and the logic circuit 11 of the transmitter shown in FIG. 1. In FIG. 4, the reference 38 denotes a clock signal input terminal coupled to terminal 8 of FIG. 1. The clock signal is counted down to ½, ¼ and ⅛ by the count-down-circuit consisting of binary counters 40, 41 and 42, which constitute the logic circuit 11. The outputs of each of these counters are caused to control the ($0-\pi/4$) modulating circuit 43, ($0-\pi/2$) modulating circuit 44 and ($0-\pi$) modulating circuit 45, respectively. The once modulated carrier wave from the input terminal 39 (coupled to summing circuit 9 of FIG. 1) is subjected to the duplicative phase modulation due to the control effected at phase-shift modulator 43, 44 and 45. Thus, a continuous carrier wave of a certain definite phase applied to the input terminal 39 is changed stepwise in phase by $\pi/4$ at a time interval 2T, and is produced as a duplicatively modulated carrier wave at the output terminal 46.

The operation of the transmitter shown in FIG. 1 will now be described referring to waveforms shown in FIG. 5. The waveform 47 indicates the output of the phase modulating circuit 2. This output takes the phases $A_1$, $A_2$, $A_3$, $A_4$, . . . at the time interval $2T$. The phase differences between every neighboring time slots, namely, $A_2-A_1$, $A_2-A_2$, $A_4-A_3$, . . . take one of the values 0, $\pi/2$, $\pi$, $-\pi/2$ depending on the code represented by information dibit A. Similarly, the waveform 48 indicates the output of the phase modulating circuit 3. This output takes the phase $B_1$, $B_2$, $B_3$, $B_4$, . . . , and the phase differences $B_2-B_1$, $B_3-B_2$, $B_4-B_3$, . . . take one of the values 0, $\pi/2$, $\pi-\pi/2$, depending on the information dibit B. Then, the waveforms 47 and 48 are time-division multiplexed by the summing circuit 9 in the form of the waveform 49. This waveform 49 is then subjected to the duplicative stepwise phase shift modulation at the modulator 10. The phase shift modulation applied here is as shown by curve 50 in FIG. 5. This waveform 50 shows that the phase is changed stepwise by $\pi/4$ at a time interval 2T. The phase-modulated multiplexed carrier wave 49 is subjected to phase shift modulation to ultimately obtain the duplicatively modulated waveform 51. More specifically, the waveform in the even-numbered time slots 52, 54, . . . takes the phase of even multiples of $\pi/4$, and that in the odd-numbered time slots 53, 55, . . . takes the phase of an odd multiples of $\pi/4$. To compare the phases at a time interval of 2T, four kinds of phase differences $\pi/4$, $3\pi/4$, $5\pi/4$ and $-\pi/4$ are derived. Therefore, the transmitted code can be correctly demodulated in such a manner that the pulses $A_1$, $A_2+\pi/4$, $A_3+\pi/2$, and $A_4+3\pi/4$ of the first half of the individual time slots (corresponding to 52, 53, 54 and 55) are taken out, and the phase differences between every two neighboring ones are detected that the information dibit A becomes (0,0) for phase difference $\pi/4$, (0,1) for $3\pi/4$, (1,1) for $5\pi/4$, and (1,0) for $-\pi 4$. Similarly, the information dibit B can be demodulated when the pulses of the latter half of the individual time slots are extracted, and their phase differences are demodulated. A concrete means for detecting the phase difference and for demodulating the transmitted code will be described later in this specification. Briefly, this demodulation can be accomplished by differential detection of phase modulation with the long delay time. The significance of the communication system of this invention lies in that the receiving pulse can be discriminated as to whether this receiving pulse is of the pulse of the first half or of the latter half of each of the above-mentioned time slots with respect to the waveform 51. If the received pulse cannot be phase-discriminated in the above-mentioned manner, it is impossible to separate dibits A from B on the receiver side. In the present invention, the channel separation or, more specifically, the discrimination between the first half and the latter half of the above-mentioned time slots can be carried out by utilizing the nature of waveform in the following manner. It should be noted in the present system that a phase change corresponding to an odd multiple of $\pi/4$ is always retained between every two neighboring time slots. On the other hand, between the first and the latter half of one time slot, the phase change is always an even (including 0) multiple of $\pi/4$. Therefore, by utilizing a circuit capable of discriminating the phase difference of an odd multiple of $\pi/4$ from an even multiple of $\pi/4$, we are able to extract the clock signal, namely the channel-separation synchronizing signal used for separating the former and the latter halves of each of the time slots. A concrete example of clock signal detecting circuit will be described later in this specification.

It should be noted regarding the waveform 51 that its clock (or repetition) frequency is $f_o$. This means that digital communication at clock frequency $f_o$ can be carried out by the use of a pair of phase logic circuits 4 and 5 (FIG. 1) each operating at clock frequency $f_o/2$. To generalize the foregoing, it follows that a digital communication system operating at clock frequency $f_o$ can be realized by the use of the logic circuit of clock frequency $f_o/M$ if $M$ different digit signals from $M$ information sources are multiplexed.

In the embodiment of FIG. 1, logic circuit 11 and stepwise phase modulating circuit 10 may be placed in the stage immediately after the carrier wave source 1. Also, the phase modulation by the information may be effected after the stepwise phase modulation has been applied.

Also in the embodiment, the multiplexing of the signals may be carried out immediately after the logic conversion performed at blocks 4 or 5. In such modification, the four-phase phase modulation is applied in response to the multiplexed base band signal having clock frequency $f_o$. In this modification, the multiplexing circuit operable at the carrier frequency band may be dispensed with. Instead, the four-phase phase modulating circuit should be operable at a frequency twice is high as the embodiment of FIG. 1. But this does not involve any difficulty because they do not comprise any binary counters.

Figure 6:
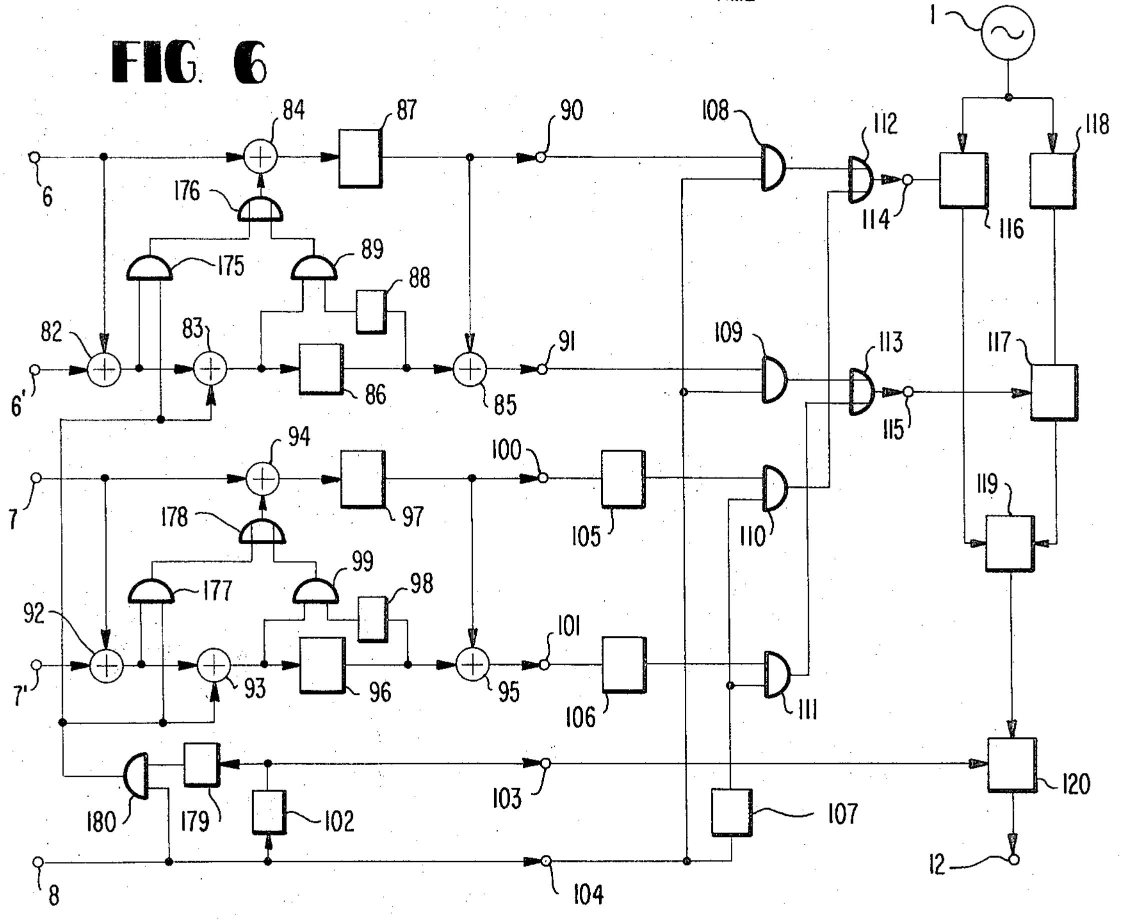
FIG. 6 is a circuit diagram of the transmitter of FIG. 1 with a slight modification.

Referring to FIG. 6 which shows, partly in blocks, a more detailed circuit diagram of the embodiment of FIG. 1. In the drawings, like elements are denoted by like numerals shown in FIG. 1. The reference numerals 82, 83, 84, 85, 92, 93, 94 and 95 denote EXCLUSIVE OR circuits; 89, 99, 175, 177 and 180 AND circuits; 176 and 178, OR circuits; 86, 87, 96, 97 and 102, binary counters of clock frequency $f_o/2$; and 88, 98, and 179, delay circuits with delay time $2T$. In the logic circuit comprising the above-mentioned elements, the circuits between the terminals 6–6′ and 90–91 and between the terminals 7–7′ and 100–101 are exactly the same as those of the logic conversion circuit shown in FIG. 3, except for the EXCLUSIVE OR circuits 83 and 93, AND circuits 175 and 177 and OR circuits 176 and 178. More specifically, the logic circuit in FIG. 6 performs full addition of the GRAY binary codes. The circuit comprising the EXCLUSIVE OR circuits 83 and 93, AND circuits 175 and 177 and OR circuits 176 and 178 is for adding the carry signals sent from the binary counter 102 which is operated by the clock signal of frequency $f_o/2$. Under the control of this circuit, the contents stored in the full adder circuit increase by one bit at each time interval of $2T$ even when the dibit A and B is (0,0). This adding operating is performed in the same manner as binary counters 40, 41 and 42 in FIG. 4. AND circuits 108, 109, 110 and 111, the OR circuits 112 and 113 and delay circuits 105, 106 and 107 with delay time $T$ constitute, a base band multiplexing circuit. The signals of clock frequency $f_o$ which have been multiplexed by the multiplexing circuit are applied via terminals 114 and 115 to the (0—$\pi$) phase modulators 116 and 117, respectively, each operating at the clock frequency $f_o$. The reference numeral 118 denotes a $\pi/2$ phase shifter; 119, a summing circuit; 1, a carrier wave source; 120, a (0—$\pi/4$) phase modulating circuit; and 121, an output terminal for the modulated carrier wave. The (o—$\pi/4$) phase modulating circuit receives a square wave of period $4T$ from the terminal 103 and causes the alternating 0 and $\pi/4$ phase modulation. The 0 and $\pi/4$ phase modulation does not make it possible to attain such phase modulation as is changed stepwise by $\pi/4$ in one direction successively. However, by virtue of the EXCLUSIVE OR circuits 83 and 93, the (0—$\pi$) phase modulating circuits 116 and 117 are operated in complementary relationship and thus, in the circuit as a whole, $\pi/4$ stepwise duplicative phase modulation is performed in addition to the phase change of an even multiple of $\pi/4$, which represent the information to be transmitted. The output of this circuit is expressed also by the waveform 51 shown in FIG. 5.

Several practical examples of transmitters of this invention have been described above, a receiver for the present system will be described below. First, the essential components of such a receiver will be described. Referring to FIG. 7, there is shown in blocks an example for extracting the clock signal of frequency $f_o/2$ from the received carrier wave of repetition frequency $f_o$. In this drawing, the reference numeral 131 denotes an input terminal for the received carrier wave; 132, a delay circuit with delay time $T$; 133, a two-phase phase-detecting circuit; 134 and 136; waveform-folding circuits; 135, a wideband amplifier; and 137, an output terminal of the extracted clock signal. The operation of this circuit will now be described referring to the waveform diagram and characteristic curves shown in FIGS. 8 *a* through *d*.

In FIG. 8 *a*, in which the abscissa indicates the phase difference between the two inputs to the two-phase phase detection circuit 133 while the ordinate indicates the output voltage of the circuit 133, the curve shows the phase detection characteristic of the two phase, phase-detecting circuit 133.

In FIGS. 8 *b*, *c*, and *d*, the abscissa indicates the lapse of time while the ordinates indicate relative values of voltages, respectively. The curve 138' in FIG. 8 *b* shows the change in the output voltage with the lapse of time. Similarly, the curve 139 in FIG. 8 *c* shows the output voltage of the voltage folding circuit 134, while the curve 140 shows the ultimate clock signal output appearing at terminal 137. One of the input signals to the circuit 133 supplied through the delay circuit 132 is delayed by $T$ with respect to the other of the inputs. On the other hand, the received signal applied to the input terminal 131 is as shown by the waveform 51 in FIG. 5, having mutually equal time intervals 52, 53, 54 and 55 (FIG. 5). Due to the time difference $T$ given by the 132 and particular phase relationship given between every two neighboring time intervals and the former-latter parts of each of the time intervals, the time intervals and the former-latter parts are unfailingly identified. To make clear the process of extracting the clock signal components, the outputs corresponding to the phase differences of an even and odd multiples of $\pi/4$ are marked on the curves 138 by "O" and "X", respectively. As shown, the output corresponding to "O" and "X" comes out alternatingly at a repetition rate of $T$. The curve 139 is obtained by folding the curve 138, and curve 140 is obtained by further folding the curve 139. As apparent from the curve 140, 0 voltage and positive voltage appear alternately at the output terminal at a rate of $T$. This means that a clock signal of repetition frequency $f_o/2$ or of repetition rate $2T$ is obtained at the output terminal 137. In the combination of FIG. 7, the circuit 133 and the waveform folding circuit 134 and 136 may be of any known type. As regards the latter, one example of such folding circuit will be found in the BSTJ, November 1958 issue, pages 1,501 to 1,542 and the BSTJ, November 1965 issue, pages 1,813 to 1,841. In the above description of the combination of FIG. 7, it has been assumed that $M = 2$ and $n = 4$. To generalize the function of the clock signal extraction circuit, $M$ may be greater than 2. For such modification, the delay time of the delay circuit is determined to be $m\ T$, while $\log_2 n$ waveform folding circuits should be added in cascade after the circuit 133. The value of $m$ may be 1, 2, 3, . . . , and $M$-1 for the purpose of detecting the clock signal. To achieve the detection efficiency, the value of $m$ should be as close to $M/2$ as possible.

Referring to FIG. 9, which shows in blocks the differential-detection type receiver for the phase-difference modulation carrier wave of the present system, the clock signal detection circuit of FIG. 7 is employed, whose like constituents are denoted by like reference numerals as shown in FIG. 7. The reference 145 denotes an input terminal for the modulated carrier wave transmitted through a transmission channel not shown. The numeral 146 denotes a delay circuit with delay time $2T$; 147, a four-phase phase detecting circuit; 141, a base band channel separating circuit; 137, an input terminal of clock signal of frequency $f_o/2$; and 143, 143', 144, 144' output terminals for the demodulated output signal. The portion of the combination comprising the delay circuit 146 and four-phase phase detecting circuit 147 is almost the same as the well-known four-phase differential detecting circuit and, accordingly, the description thereof may be omitted. In a differential-detection type receiver, the delay time of the delay circuit 146 is chosen equal to the length of one code (which corresponds to T as defined in the present invention). However, in this embodiment, the delay time is set at $2T$.

The embodiment will now be briefly described referring to the waveform 51 of FIG. 5. At the four-phase phase detecting circuit 147, the phase differences $[(A_2+\pi/4)-A_1]$, $[(B_2+\pi/4)-B_1]$, $[(A_3+\pi/2)-(A_2+\pi/4)]$, $[(B_3+\pi/2)-(B_2+\pi/4)]$, . . . are sequentially detected. In other words, the information dibits A and B are alternately demodulated to form a pulse train of clock frequency $f_o$. This pulse train is led to the demultiplexing or the channel separation circuit 141. The demultiplexing circuit 141 gates the input pulse train in response to a clock signal of repetition rate $2T$ and delivers one output. The input pulse train is gated by the clock signal of the repetition rate $2T$, deviated by $T$ from the first clock signal. Thus, another output is obtained. This demultiplexing circuit 141 is of any well-known circuit including electronic switching and gating circuits. The demultiplexed signals are thus reproduced and extracted at output terminals 143, 143′, 144 and 144′. The signals appearing at these terminals correspond to the information dibits A and B applied to the terminals 6, 6′, 7 and 7′ of the transmitter shown in FIG. 1.

In the receiver, the phase detection for extracting the dibits A and B may be performed after the demultiplexing has been finished in the carrier frequency band. So far as the differential type detection of the embodiment is concerned, slight lengthening of delay time is sufficient to adapt a conventional receiver to the reception of the modulated carrier wave according to the present invention. As will be described later, the same is not true with a coherent-detection-type receiver.

FIG. 10 shows in blocks a coherent-detection-type receiver adapted to reproduce the carrier waves modulated and multiplexed in accordance with the present invention. In contrast to the above-described differential detection, where the $2n$ different kinds of phase shift are discriminated by an $n$-phase discriminating means, a coherent-detection-type receiver needs a $2n$-phase phase discriminating means. In this example, however, an $n$-phase phase discriminating means is employed in combination with a $(0-\pi/4)$ stepwise phase modulating circuit. The reference numeral 254 denotes an input terminal for the transmitted carrier wave; 255, a four-phase phase discriminating circuit; 256 a carrier wave extracting circuit. The combination of these circuit constituents may be the one described in the specification of U.S. Pat. No. 3,336,534. The reference numeral 257 denotes a channel separation or demultiplexing circuit operating at the baseband region; 258, the clock signal extracting circuit whose block diagram has been described above with reference to FIG. 7. Terminal 137 for receiving the timing signal at the clock frequency $f_o/2$ corresponds to the one denoted by the like numeral in FIG. 7. The reference numerals 259 and 260 constitute logic conversion circuits; and terminals 261–261′ and 262–262′ are output terminals respectively for dibits A and B. Blocks 10 and 11 are $(0-\pi/4)$ stepwise phase modulation means and logic circuit, respectively, and may be identical to those in FIG. 1 denoted by like reference numerals. The purpose of these elements is to cause a stepwise phase shift by $\pi/4$ at a repetition rate of $2T$. In this coherent-detection-type receiver, what is detected by the phase discriminating circuit 255 is not the phase change of the transmitted carrier wave but the phase which is derived dependent on $\pi/4$-stepwise phase modulation applied as a reference phase signal to the carrier of the carrier extracting circuit. Therefore, the carrier wave must be converted by the logic operation into a binary signal corresponding to the phase change of the transmitted carrier wave. The logic circuits 259 and 260 are provided for this operation. The function of these logic circuits is the full subtraction operation of Gray binary codes. Concrete examples ofthese circuits are illustrated in FIG. 11. The output of the phase discriminating circuit 255 is of a binary signal of clock frequency $f_o$. A circuit operable at the clock frequency $f_o/2$ will suffice for the purpose of the logic circuits 259 and 260 since the output of the phase discriminating circuit 255 is converted into a pair of information dibit signals of clock frequency $f_o/2$ by the base band demultiplexing circuit 257. The demultiplexing circuit 257 may be the same as the demultiplexing circuit 141 used in the embodiment of FIG. 9.

FIG. 11 shows an example of logic circuit corresponding to the circuit 259 or 260 of the receiver shown in FIG. 10. In FIG. 11, the reference numerals 263 and 264 indicate such input terminals for a dibit signal as correspond to terminals $b$–$b'$ or $c$–$c'$ of the receiver of FIG. 10. The reference numerals 265, 266, 267, 268 and 269 denote EXCLUSIVE OR circuits; 270 and 271, delay circuits with delay time 2T, 272, an AND circuit; and 273 and 274, output terminals. The EXCLUSIVE OR circuits 265 and 269 are for converting Gray binary code into a conventional binary code or vice versa, and other circuits are for the full subtraction of the conventional binary code. The circuits as a whole functions as a full subtraction circuit of the Gray binary code.

Continuing to refer to FIG. 10 and further referring to FIGS. 12 and 16, the coherent-detection-type receiver of FIG. 10 will be further described. In FIG. 12, lines 1001 and 1001′ show the waveforms of the paired binary input signals of a first channel, while lines 1002 and 1002′ show the similar waveforms for a second channel. In the multiplexed and duplicatively phase modulated state, the carrier waves have the phase changes as shown in lines 1003.

It is assumed here that the phase shift modulation is performed in this invention with the phase shift relationship of FIG. 16 *a* maintained (to be described in detail hereunder). The carrier phase shift shown in FIG. 16 *a* is the ordinary four-phase phase modulation plus the duplicative $\pi/4$ stepwise phase shift to be applied at a rate of $T$. More specifically, the phase shift of an odd multiple of $\pi/4$ to the carrier wave with respect to a particular phase corresponding to an immediately preceding time slot. As indicated by arrows in FIG. 16*a*, the possible phase shift positions correspond to dibits (00), (01), (11), and (10), respectively. Suppose that the carrier wave takes in a moment a certain phase equal to an even multiple of $\pi/4$, the phase in the immediately following time slot is always an odd multiple of $\pi/4$. The alternating phase change in the odd- and even- multiples of $\pi/4$ is repeated permanently. For further details of the basic phase-difference modulation, see the description given in the above-mentioned U.S. Patent application given in conjunction with FIGS. 3A–3E thereof. In the following description, it is assumed for the simplicity of description that the information-dibit-representing phase variation is as shown in FIG. 16*b*, while the phase relationship of the ultimately phase-modulated carrier wave is as shown in FIG. 16*a* where the $\pi/4$ stepwise phase modulation has been duplicatively applied. It should be noted with respect to FIG. 16*a* and *b* that the dibit vs. phaseshift relationship is based on the Gray code principle which is excellent for its error-resistant property.

Now, referring to FIG. 12, the phase shift diagram 1003 correspond to the phase change in the signal at terminal 254, while the waveform 1004 shows that observed at point $d$ of FIG. 10. The subtraction at circuit 255 of the phase diagram 1004 from 1003 produces the difference phase diagram shown in line 1005. The difference component is detected at the four-phase phase detecting circuit 255. Waveforms 1006 and 1006' are those of the output of the circuit 255 observed at points *a* and *a'*. Denoting the binary codes observed at these points *a* and *a'* by (*a*, *a'*), the following relationship is assumed between the code (*a*, *a'*) and the phase difference in the two input signals applied to the circuit 255:

| phase difference | code (a, a') |
|---|---|
| 0 | (0 0) |
| $\pi/2$ | (0 1) |
| $2\pi/2$ | (1 1) |
| $-\pi/2$ | (1 0) |

On the other hand, the clock signal at terminal 137 is as as shown by waveform 1007. The codes 1006 and 1006' are divided at the circuit 257, in response to this clock signal, into the former half and the latter half of the time interval. Waveforms 1008–1008' and 1009–1009' are those observed at points *b–b'* and *c–c'* in FIG. 10. The waveform 1006 is divided with 1008 and 1009, while another waveform 1006' into 1008' and 1009', so that waveforms 1008–1008' may form the first half of one frame and waveforms 1009–1009' the latter half of one frame.

Waveforms observed at output terminal pair 261–261' are as shown in lines 1010 and 1010', which are the resultant of the full subtraction of waveforms 1008 and 1008'. Similarly, those waveforms at terminal pair 262–262' are as shown in lines 1011 and 1011', which are the resultant of the full substraction of waveforms 1009 and 1009'. Waveforms 1001–1001', 1010–1010', 1002–1002' and 1011–1011' show that the desired reproduction of the original signals has been carried out.

FIG. 13 shows in blocks another example of a coherent-detection-type receiver embodying the principle of this invention. The feature of this example lies in that there is no need for the ($0-\pi/n$) stepwise modulating circuit. The receiver of FIG. 13 is assumed to be adapted to the condition $M = 1$ and $n = 4$. In FIG. 13, the reference numeral 301 denotes an input terminal for the transmitted carrier wave of clock frequency $f_o$; 256, a carrier wave extracting circuit for extracting a signal wave synchronized with the carrier wave component of the received signal; 258, a clock signal extracting circuit for extracting the clock signal of frequency $f_o$; 290, a pulse shaping circuit including a binary counter for frequency-dividing the extracted clock signal into one half and for converting it into a pulse of repetition rate $2MT$ (i.e., $2T$); 305, a ($0-\pi/4$) phase modulating circuit for subjecting the extracted carrier wave component, under the control of the output of the pulse shaping circuit 290, to the alternating 0-phase and $\pi/n$ ($=\pi/4$) phase shift modulation; and 306, a four-phase phase detecting discriminating circuit in which the extracted carrier wave component supplied from the extracting circuit 256 via the phase modulating circuit 305 is used as a reference phase. The output terminal pair of the circuit 306 corresponds a pair of binary signals to be extracted. The reference numeral 307 denotes a differential logic operation circuit for extracting the phase difference of the output of the circuit 306 at a rate of *T;* and 308, a subtraction logic operation circuit for subtracting, under the control by the output of the pulse shaping circuit 290, a dibit (01) from the output of the differential logic operation circuit 307 for the period of time *T* at an interval of $2T$. The reference numerals 309 and 309' are code output terminals. In this example, the carrier extracting circuit 256, clock signal extracting circuit 258, ($0-\pi/4$) phase modulating circuit 305 and four-phase phase detecting-discriminating circuit 306 may be of any known type. Therefore, no further description will be given here for these constituents. It should be noted here that the four-phase phase detecting and discriminating circuit 306 comprises a phase detection circuit and discrimination circuit.

FIG. 14 is a circuit diagram of the circuits 307 and 308 used in the receiver of FIG. 13. In FIG. 14, the reference numerals 310 and 310' denote input terminals coupled to the output of the circuit 306 of FIG. 13. Reference numerals 314, 315, 316, 320, 322, 323 and 324 denote EXCLUSIVE OR circuits; 317 and 318, delay circuits with delay $MT(=T)$; 319 and 321, INHIBIT circuits; and 313, an input terminal for the signal supplied from the pulse shaping circuit 290. The circuit lying between terminals 310–310' and 311–311' is a conversion circuit for converting an Gray binary code into a conventional binary code, while the circuit lying between terminals 311–311' and 312–312' is a differential logic operation circuit for detecting the change in the code at every time interval *T;* the circuit lying between terminals 312–312' and 325–325' is a conventional binary subtraction logic operation circuit for subtracting the code-represented number at the terminal 313 from another code-represented number at the terminals 312–312'; and the circuit lying between terminals 325–325' and 309–309' is a conversion circuit for converting a conventional binary code into a Gray binary code. The circuit as a whole performs the differential logic operation and subtraction logic operation on the Gray binary code. The operation of this receiver will be described referring to the phase and waveform diagrams shown in FIGS. 15, 16 and 17.

For the simplicity of description, the received carrier wave is assumed to represent a continued (00) code. The phase variation needed for the frame synchronization is as shown by a curve 1340 in FIG. 17. The signal represented by curve 1340 is applied to the four-phase phase detection circuit 306. On the other hand, the carrier wave component extracted at the circuit 256 is phase modulated at the ($0-\pi/4$)-phase phase modulating circuit 305 and then applied to the circuit 306 as the reference signal. The phase modulating circuit 305 generates, under the control by the output of the pulse shaping circuit 290, a square wave of a repetition rate $2T$. Accordingly, the phase of the reference signal is changed as indicated by the waveform 1341 in FIG. 17. The waveform 1342 in FIG. 17 shows the difference in phase between the waveforms 1340 and 1341. This phase difference is discriminated by the circuit 306 and has the waveform as shown in FIG. 16*c*, in which the zero phase difference corresponds to dibit (00), $2\pi/4$ to dibit (01) and so forth. The discriminated code is applied to the terminals 310 and 310' and converted into a conventional binary code for the convenience of the subsequent logic operation. The converted signal appears at the terminals 311 and 311'. FIG. 16*d* shows the relationship between the code appearing at the terminals 311 and 311' and the phase of the signal applied to the phse detecting-discriminating circuit 306. As indicated by the waveforms 1342 in FIG. 17, the same dibits (00), (01) and (10) are discriminated, applied to the terminals 311 and 311' at time points 0 and $T$; $2T$ and $3T$; and $4T$; and $5T$, respectively, and thereby subjected to differential logical operation. Thus all the codes appearing at the terminals 312 and 312' become (00). On the other hand, the codes at the terminals 311 and 311' are changed from (00) to (01) or from (01) to (10) for the period between $T$ and $2T$ and between $3T$ and $4T$, respectively. Consequently, the resultant difference codes (01) appears at the terminals 312 and 312'. To prevent the code (01) from appearing at a time interval of $2T$ despite the transmission code (00), it is necessary to subtract the code (01) from the code appearing at the terminals 312 and 312' at the interval of $2T$. This logic operation is performed by the subtraction logic operation circuit 308, which lies between terminals 312–312' and 325–325'. The subtracting operation at time interval $2T$ is controlled by the pulse circuit 290 by way of the terminal 313. Then, the codes at the terminals 325 and 325' are reconverted into the Gray binary codes by the subsequent circuit and applied to the terminals 309 and 309' and thus correctly demodulated.

The operation for the continuation of dibit (00) has been described above. If the transmission code takes various values, the signal is demodulated in the following manner.

Figure 15:
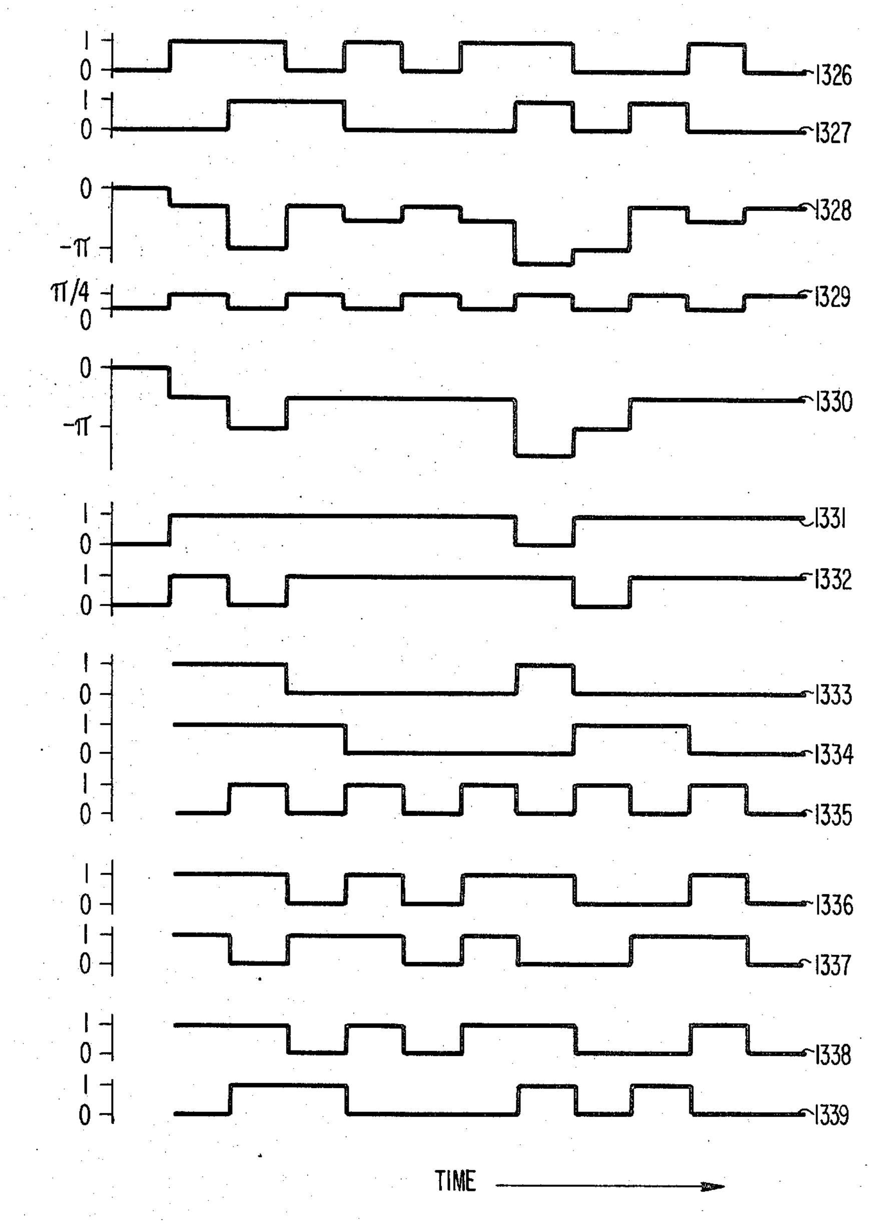

Referring to FIG. 15, the waveforms 1326 and 1327 are respectively of the transmission codes $2^1$ figure and $2^0$ figure of the dibit included in each time slot. The transmission phase with respect to this code is changed according to the vector shown in FIG. 16*a*. This transmission signal is as indicated by the waveform 1328. The waveform 1329 indicates the reference signal applied to the four-phase phase detecting-demodulating circuit 306. The waveform 1330 represents the phase difference between the waveforms 1328 and 1329. This phase difference is discriminated by the circuit 306. The waveforms 1331 and 1332 indicate the codes appearing at the terminals 311 and 311' in FIG. 14. FIG. 16*d* shows the relationship between the code appearing at the terminals 311 and 311' and the phase difference indicated by the waveform 1330. The codes indicated by the waveforms 1331 and 1332 are applied to the differential logic operation circuit (i.e., the circuit lying between terminals 311, 311' and 312, 312') of conventional binary code, whereby the difference component is extracted from the codes. The resultant codes are indicated by the waveforms 1333 and 1334. In the subtraction logic operation circuit, the value of the waveform 1335 is subtracted from the codes (indicated by the waveforms 1333 and 1334). In other words, the code (01) is subtracted from the codes at a time interval of $2T$. The resultant codes, as indicated by the waveforms 1336 and 1337, appear at the terminals 325 and 325'. These codes, when converted into the Gray binary code, are as shown by the waveforms 1338 and 1339. Comparing the waveforms 1326 and 1327 with the waveforms 1338 and 1339 appearing at the terminals 309 and 309', it is apparent that two codes are indentical to each other. This shows that the signal has been correctly demodulated. The subtraction quantity of the subtraction logic operation circuit 307 will be described hereunder assuming a general relationship between the quantity of the $\pi/4$ stepwise phase shift at an interval of T. This phase shift is given in addition to the phase shift representative of the signal to be transmitted. The modulation phase i.e., $\pi/4$ of the $(0-\pi/4)$ phase modulating circuit in this receiver, of the phase modulating circuit of the receiver will now be further described. It is assumed here that $n$ and $M$ are 4 and 1, respectively. For the simplicity of explanation, the conventional binary code type phase modulation is considered. In this case, eight phases ($2n$ phases) mutually different by $\pi/4$ from one another are expressed in a conventional three digit binary code as shown in FIG. 18. It is further assumed that the transmission code is expressed by $(a_j\, b_j)$ (where $j$ is a suffix indicating the code at time point $jT$), its corresponding transmission phase by $(e_j^{(2)}\, e_j^{(1)}\, e_j^{(0)})$ the quantity of the stepwise phase change at a time interval $T$ (this phase change is given in addition to the phase change representative of the transmission code) is expressed by $(C^{(2)}\, C^{(1)}\, C^{(0)})$, and the modulation phase $k\,\pi/n$ of the phase modulating circuit 305 of the receiver by $(d^{(2)}\, d^{(1)}\, d^{(0)})$. Then the transmission phase is expressed by the following equations.

$$(e_j^{(2)}\, e_j^{(1)}\, e_j^{(0)}) = (a\, b\, 0) + (e_{j-1}^{(2)}\, e_{j-1}^{(1)}\, e_{j-1}^{(0)}) \oplus (C^{(2)}C^{(1)}C^{(0)}) \tag{1}$$

$$(e_{j-1}^{(2)}\, e_{j-1}^{(1)}\, e_{j-1}^{(0)}) = (a_{j-1}b_{j-1}) \oplus (e_{j-2}^{(2)}\, e_{j-2}^{(1)}\, e_{j-2}^{(0)}) \oplus (C^{(2)}C^{(1)}C^{(0)}) \tag{2}$$

$$(e_{j-2}^{(2)}\, e_{j-2}^{(1)}\, e_{j-2}^{(0)}) = (a_{j-2}b_{j-2}0) + (e_{j-3}^{(2)}\, e_{j-3}^{(1)}\, e_{j-3}^{(0)}) \oplus (C^{(2)}C^{(1)}C^{(0)}) \tag{3}$$

When the phase of the reference signal for demodulation at time point $(j-1)T$ is assumed to correspond to (000), the phase will become $(d^{(2)}\, d^{(1)}\, d^{(0)})$ at time $jT$. Thus, from Equations (2) and (3), the output of the differential logical conversion circuit at time $(j\text{-}1)T$ is expressed as follows:

$$\begin{aligned}&[(a_{j-1}b_{j-1}0)\oplus(e_{j-2}^{(2)}e_{j-2}^{(1)}e_{j-2}^{(0)})\oplus(C^{(2)}C^{(1)}C^{(0)})\ominus(000)]\\ &\ominus[(a_{j-2}b_{j-2}0)\oplus(e_{j-3}^{(2)}e_{j-3}^{(1)}e_{j-3}^{(0)})\oplus(C^{(2)}C^{(1)}C^{(0)})\ominus(d^{(2)}d^{(1)}d^{(0)})]\\ &\left[\begin{aligned}&(a_{j-1}b_{j-1}0)\ominus(a_{j-2}b_{j-2}0)\oplus(e_{j-2}^{(2)}e_{j-2}^{(1)}e_{j-2}^{(0)})\\ &\ominus(e_{j-3}^{(2)}e_{j-3}^{(1)}e_{j-3}^{(0)})\oplus(d^{(2)}d^{(1)}d^{(0)})\end{aligned}\right]\end{aligned}$$

From Equation (3), the above resultant expression is rewritten as $$(a_{j-1}b_{j-1}0)\oplus(C^{(2)}C^{(1)}C^{(0)})\oplus(d^{(2)}d^{(1)}d^{(0)}).$$

This represents the transmission code $(a_{j-1}b_{j-1})$ plus extra $(C^{(2)}\, C^{(1)}\, C^{(0)}) \oplus (d^{(2)}d^{(1)}d^{(0)})$, and this duplicative phase change is to be subtracted from the transmission code in the demodulation stage. The output of the differential logical conversion circuit at the following time $jT$ is derived as follows from Equations (1) and (2):

$$\begin{aligned}&[(a_jb_j0)\oplus(e_{j-1}^{(2)}e_{j-1}^{(1)}e_{j-1}^{(0)})\oplus(C^{(2)}C^{(1)}C^{(0)})\ominus(d^{(2)}d^{(1)}d^{(0)})]\\ &\ominus[(a_{j-1}b_{j-1}0)\oplus(e_{j-2}^{(2)}e_{j-2}^{(1)}e_{j-2}^{(0)})\oplus(C^{(2)}C^{(1)}C^{(0)})\ominus(000)]\\ &\left[\begin{aligned}&(a_jb_j0)\ominus(a_{j-1}b_{j-1}0)\oplus(e_{j-1}^{(2)}e_{j-1}^{(1)}e_{j-1}^{(0)})\\ &\ominus(e_{j-2}^{(2)}e_{j-2}^{(1)}e_{j-2}^{(0)})\ominus(d^{(2)}d^{(1)}d^{(0)})\end{aligned}\right]\end{aligned}$$

This resultant expression is rewritten as follows by using equation (2): $(a_jb_j0) \oplus (\overline{C^{(2)}C^{(1)}C^{(0)}}) \ominus (\overline{d^{(2)}d^{(1)}d^{(0)}})$ This represents the transmission code $(a_jb_j)$ plus extra $(\overline{C^{(2)}C^{(1)}C^{(0)}}) \ominus (\overline{d^{(2)}d^{(1)}d^{(0)}})$. This extra phase change is to be subtracted in the demodulation operation. The operation in the above relationship is alternately repeated. In other words, the alternate subtraction of $(\overline{C^{(2)}C^{(1)}C^{(0)}}) \oplus (\overline{d^{(2)}d^{(1)}d^{(0)}})$ and $(C^{(2)}C^{(1)}C^{(0)}) \ominus (\overline{d^{(2)}d^{(1)}d^{(0)}})$ from the output of the differential logic operation circuit 307 is performed at the subtraction logic operation circuit 308. This makes it possible to reproduce the original information code.

This principle is applicable also to the receiver of FIG. 16. In this case, the duplicative stepwise phase change caused at an interval of $T$ iw as shown by the phase diagram is FIG. 16 ($a$). This phase shift corresponds a three digit binary code (001) according to the phase diagram shown in FIG. 18. More definitely $$(\overline{C^{(2)}C^{(1)}C^{(0)}}) = (001).$$

The modulation phase applied at the phase modulating circuit 305 is $\pi/4$. Therefore, this value is given by $$(\overline{d^{(2)}d^{(1)}d^{(0)}}) = (001).$$

This results in the following equations:

$$(\overline{C^{(2)}C^{(1)}C^{(0)}}) \oplus (\overline{d^{(2)}d^{(1)}d^{(0)}}) = (010) \text{ and}$$
$$(C^{(2)}C^{(1)}C^{(0)}) \ominus (d^{(2)}d^{(1)}d^{(0)}) = (000).$$

It should be noted that the least significant digits of (010) and (000) have no significance, because (1) the output of the differential logic operation circuit is expressed by two digit code when $n = 4$, (2) these codes correspond to the phase of an even multiple of $\pi/4$ in FIG. 18 and, (3) all these corresponding codes have 0 in the least significant digit. To achieve correct demodulation, it is apparent that digits (01) and (00) should be alternately subtracted from the output of the differential logic operation circuit 307. This conclusion is coincident with what has been described above in connection with FIG. 13.

Several examples of transmitters and receives to be employed in the communication system of the present invention have been described above. Since the phase-difference-modulation communication system has an excellent noise-resisting property, the need for repeaters is comparatively low. However, to set up a large scale network, repeaters are necessary. A few examples of repeaters will now be described referring to FIGS. 19, 20, 21 and 22.

FIG. 19 shows in blocks an example of a coherent-detection-type repeater embodying the principle of this invention. The reference numeral 401 indicates an input terminal for incoming modulated carrier waves of clock frequency $f_0$; 258, a clock signal extracting circuit for extracting the clock signal of frequency $f_0/M$: $f_0/2$ ($M$ is assumed to be 2); 290, a pulse shaping and frequency-dividing circuit for producing a clock signal of a repetition rate of one half of the input and of pulse width $MT$ and period $2MT$; 256, a carrier wave extracting circuit for producing a reception carrier wave synchronized with the carrier wave component of the received signal; and 305, a (0– $\pi/n$) phase modulating circuit for applying the alternating 0-phase and $\pi/n$ phase modulation (i.e., for $k = 1$) to the carrier wave, under the control by the output pulse of said pulse shaping circuit 290. The block 305' indicates that phase modulating circuit may be inserted here as an alternative to the illustrated example of FIG. 19. The reference numeral 406 denotes an n-phase phase detecting circuit for phase detecting the received carrier wave (or the output of the phase modulating circuit 305'). In the circuit 406, the output of the phase modulating circuit 305 (or the carrier wave extracting circuit 256) is used as the reference phase; 407, a discriminating regenerating circuit for recognizing the output of the $n$-phase phase detecting circuit (the combination of circuits 406 and 407 corresponds to block 306 of FIG. 13); 408, an $n$-phase phase modulating circuit; 409, a transmission carrier wave source; and 410, a (0– $\pi/n$) phase modulating circuit for applying alternate modulation of 0-phase and $\pi/n$ phase (i.e., for $k = 1$; where the value of $k$ is identical to that for the modulation circuit 305) to the output of the $n$-phase phase modulating circuit 408 under the control by the output of the pulse circuit 290. The block 410' indicates the phase modulating circuit 410 may be inserted here as an alternative to the illustrated example of FIG. 19. The reference numeral 411 denotes an output terminal of the repeater.

In this repeater equipment, the clock signal extracting circuit 258 the carrier wave extracting circuit 256, four-phase detecting circuit 406, $n$-phase phase modulating circuit 408, discriminating regenerating circuit 407, (0– $\pi/n$) phase modulating circuits 305 and 410 may be of any known devices. In FIG. 19, the constituents 406, 407, 408 and 409 constitute an $n$-phase phase regenerating circuit.

The operation of the repeater of FIG. 19 will now be described referring to the waveforms shown in FIG. 21. It should be noted that the foregoing description of constituents has been based on the condition $M = 2$, and that this condition leads to give an account of the multiplexing operation according to this invention. The coherent detection relied on by this repeater is applicable to the condition $M = 1$. Hence, for the simplicity of explanation, it is now assumed for the repeater of FIG. 21 that $M = 1$ and $n = 2$. Also, it is assumed that the alternate is not employed relying circuits 305' and 410'. Referring to FIG. 21, in which the abscissa indicates time, and the ordinate phase, the waveforms show phase change observed at various points in the repeater of FIG. 19. The waveform 1212 shows the phase change representing the information to be transmitted. The signal whose phase change is as shown by waveform 1212 is transmitted in the case of phase modulation method cohere $n$ phases to be used for the transmission of $\log_2 n$ bits in two. In the present system, the signal having the phase change as shown by waveform 1214 which has been given the duplicative phase change as shown by waveforms 1213 and 1213' in addition to the waveform 1212 is transmitted. Since the 0-phase and $2\pi$ phase are actually the identical phase, the waveform 1213' shown therein stands at 0-phase, which is $2\pi$ behind the waveform 1213 in phase. The signal with waveform 1214 suffers distortion while being transmitted through the transmission channel or other parts of the system. Likewise, it tends to be involved in interference due to thermal noise, etc. Such noise-affected signal is as shown by the waveform 1215. For the phase regeneration directly from the waveform 1215 into the waveform 1214, it is necessary to use a four-phase phase regenerating circuit because the waveform 1214 takes four ($2n$; $n = 2$) phase values. To regenerate this signal, two-phase phase discription is sufficient when the differential detection, is used, while four-phase phase discrimination is needed when the coherent detection is used. It should be noted here that the phase regenerating circuit may be of two phases with the present invention when the coherent detection is relied on. The waveform 1216 shows the phase change of the output signal of the carrier extracting circuit 256, which signal has been phase-modulated at the phase modulating circuit 305 under the control by the output (a square wave of repetition rate 2T) of the pulse circuit 290. In the detecting circuit 406, the phase difference between the received signal and the reference signal, i.e., the phase of the waveform 1217 representing the phase difference between the waveforms 1215 and 1216, is detected. As shown in the drawing, this phase takes the form of a binary code. Therefore, the output of the two-phase phase regenerating circuit comprising the phase detecting circuit 406, discriminating-regenerating circuit 407, phase modulating circuit 408 and carrier oscillating circuit 409 is as shown by the waveform 1218. An extra phase change as indicated by the waveform 1219 is applied to the signal with a phase as the waveform 1218 by the phase modulating circuit 410 under the control by the square wave of repetition rate $2T$, whereby a signal having the phase variation indicated by the waveform 1220 is delivered to the output terminal 411. This waveform 1220 is perfectly identical to the waveform 1214, which shows the phase change of the modulated carrier wave.

In FIG. 19, it is assumed that the phase modulating circuit 410′ is employed in place of 410. In general, when phase modulation is duplicatively applied, the resultant phase of the modulated carrier is made equal to the sum of the phase shift in each of the time slot. In other words, the phase of the output carrier wave does not depend on the order of modulation. For example, the change of the order of modulating circuits 408 and 410 to the order of 410′ and 408 does not affect the output phase.

In FIG. 19, it is also assumed that the phase modulating circuit 305′ is employed in place of 305. In such modification, the phase detecting circuit 406 detects the phase difference appearing as a result of the phase subtraction of the output of the carrier extracting circuit 256 from the output of the phase modulating circuit 305′. In other words, the summation of the received signal phase and the phase modulated applied by the phase modulating circuit 305′ is detected at the phase detecting circuit 406. This operation differs from the case where the circuit 305 is used in that the difference in operation in which phase is derived in the latter in response to the phase subtraction of the modulation applied phase from the received carrier wave. To assure the same operation regardless of the use of the circuit 305′ or 305, the circuit 305′ should be controlled by the pulse signal composed of binary digits complementary to those of the pulse signal for controling the phase modulating circuit 410 or 410′. More specifically, a negation logic circuit not shown in FIG. 19 is inserted either between the pulse circuit 290 and phase modulating circuit 410 or 410′ or between the pulse circuit 290 and phase modulating circuit 305.

FIG. 22 shows various phase variations observed at various points in the repeater of FIG. 19 operating under another mode of operation. With respect to FIG. 22, the condition is assumed to be $M = 2$ and $n = 2$. In the drawing, the abscissa indicates time, and the ordinates phase. The waveform 1221 shows the phase change representative of the information to be transmitted. The waveform 1222 shows the synchronizing signal phase change given to the transmission signal. More definitely, the phase is changed by $\pi/2$ ($n = 2$) at a time interval of $2T$ ($M = 2$). The waveform 1223 shows the phase of transmission signal which is the sum of the waveforms 1221 and 1222. The waveform 1224 shows the phase variation of the received signal; and 1225, the phase of the modulated signal from the phase modulating circuit 305, to which the carrier wave is supplied from the carrier wave extracting circuit. The phase modulating circuit 305 is controlled by the square wave of a period $4T$ (i.e., 2 $MT$) which is the output of the pulse circuit 290. The waveform 1226 shows the phase difference between the two input signals detected by the phase detecting circuit 406. This phase difference represents the difference between the waveforms 1224 and 1225. The waveform 1227 indicates the output phase of the two-phase phase regenerating circuit comprising the phase modulating circuit 406, discriminating-regenerating circuit 407, phase modulating circuit 408 and transmission carrier oscillating circuit 409. The waveform 1229 shows the phase modulated by the modulating circuit 410. The waveform 1229 shows the phase of the transmission signal appearing at the terminal 411. This waveform is the sum of the waveforms 1227 and 1228 and is perfectly identical to the waveform 1223.

Another repeater of the invention will be described referring to FIG. 20. This repeater comprises the same elements as those of the embodiment shown in FIG. 19, with the exception that the former is not provided with the elements 409 and 410. In the arrangement of FIG. 20, the output of the carrier wave extracting circuit is used as the transmission carrier souce. In addition, the phase modulating circuit 305 functions also as the phase modulating circuit 410′ shown in FIG. 19. The operation of this repeater will be apparent from the operation of the arrengement of FIG. 19.

In the foregoing examples of repeaters, the ($0$–$k\ \pi/n$) phase modulating circuit is considered for $k = 1$ only. It is apparent that a similar repeater comparable in its function to these examples may be realized even when $k$ is an arbitrary odd number.

As has been described above, a repeater capable of regeneratively repeating a phase-modulated wave representative of synchronizing information can be realized by the use of comparatively simple circuit.

In the foregoing description, it has been assumed that the Gray binary code is converted into a conventional binary number and then is converted into the Gray binary code again, so as to simplify the counter circuits. It will be apparent, however, that such code conversion is not always needed. In other words, either the Gray binary code or the conventional binary code may be used throughout the system.

Also the numbers $M$ and $n$ may be chosen arbitrarily without examples shown.

What is claimed is:

1. A phase-difference-modulated carrier wave transmission system comprising: a source of a carrier wave;

n-phase phase-modulating circuits operating at clock frequency $f_o/M$, where $n$ stands for the number of phases to be multiplexed and included in each frame and, $f_o$ for a transmission repetition frequency and M for the number of channels to be multiplexed; a logic circuit for each of said phase modulating circuits causing the phase modulating circuit to perform the phase difference modulation; a multiplexing circuit for time-division multplexing the signals from said modulating circuits into a multiplexed pulse signal having the repetition frequency $f_o$; a stepwise phase-modulating circuit for applying a duplicative stepwise phase-difference modulation at an interval corresponding to the length of a frame of the time division multiplexing; and a logic circuit for generating a pulse to drive said stepwise phase modulating circuit.

2. A phase-difference-modulated carrier wave transmission system comprising: a source of a carrier wave; logic circuits for the phase difference modulation; a multiplexing circuit for time-division-multiplexing the information signal applied from said logic circuits; $n$-phase phase-modulating circuit for modulating the carrier wave in accordance with the multiplexed information signal, where $n$ stands for the number of phases to be multiplexed and included in each frame; a stepwise phase modulating circuit for applying a duplicative stepwise phase-difference modulation to the phase-difference modulated carrier wave at an interval corresponding to the length of a frame of the time division multiplexing; and a logic circuit for generating a pulse to drive said stepwise phase modulating circuit.

3. A differential-detection type receiver for the transmission system as claimed in claim 2, comprising: an input terminal for the modulated carrier wave transmitted through a transmission channel of said transmission system; a clock signal extracting circuit; a delay circuit having delay time equal in length to one frame of the time division multiplexing; $n$-phase phase detecting circuit, where $n$ stands for the number of phases to be multiplexed and included in each frame; a channel separating circuit; and output terminals for the demodulated output signals.

4. A coherent-detection type receiver for the transmission system as claimed in claim 2, comprising: an input terminal for the transmitted carrier wave; a carrier wave extracting circuit for extracting a carrier signal component synchronized with the received signal; a clock signal extracting circuit; a logic circuit responsive to the clock signal; a stepwise phase modulation means for phase-modulating the carrier wave from the carrier wave extracting circuit in response to the output from the logic circuit, an $n$-phase discriminating means for discriminating the received carrier wave in accordance with the stepwise modulated carrier wave applied by said stepwise phase modulation means; a channel separation circuit; a logic conversion circuit for converting the discriminated signal into a signal corresponding to the phase change of the transmitted carrier wave; and output terminals for the demodulated output signals.

5. A coherent-detection type receiver for the transmission system as claimed in claim 2, comprising: an input terminal for the transmitted carrier wave; a carrier wave extracting circuit for extracting a carrier wave component synchronized with the received signal; a clock signal extracting circuit; means for frequency-dividing the extracted clock signal into one half; a phase modulating circuit for applying the alternating phase modulation to the carrier wave under the control by the output of said frequency-dividing means; $n$-phase phase-detecting circuit (where $n$ stands for the number of phases to be multiplexed and included in each frame of the time division multiplexing) supplied with the extracted carrier wave component supplied via the phase modulating circuit as a reference phase signal; a differential logic circuit for detecting the phase difference of the output of the $n$ phase phase-detecting-discriminating circuit; a subtraction logic circuit for subtracting under the control by the output of the frequency-dividing means a dibit from the output of the differential logic operation circuit and an output terminal for the demodulated signal.

6. A coherent-detection type repeater for the transmission system as claimed in claim 2, comprising: an input terminal for the transmitted carrier wave; a clock signal extracting circuit; means for frequency-dividing the extracted clock signal into one half; a carrier wave extracting circuit for extracting a carrier wave component synchronized with the received signal; a phase modulating circuit for applying the alternating phase modulation to the carrier wave under the control by the output of said frequency-dividing means; an $n$-phase phase-detecting circuit, where $n$ stands for the number of phases to be multiplexed and included in each frame of the time-division multiplexing, a discriminating regenerating circuit for recognizing the output of the $n$-phase phase-detecting circuit; an $n$-phase phase-modulating circuit; a transmission carrier wave source; a phase modulating circuit for applying alternate modulation to the output of the $n$-phase phase-modulating circuit under the control by the output of the pulse circuit; and an output terminal.

7. A coherent-detection type repeater for the transmission system as claimed in claim 2, comprising: an input terminal for the transmitted carrier wave; a clock signal extracting circuit; means for frequency-dividing the extracted clock signal into one half; a carrier wave extracting circuit for extracting a carrier wave component synchronized with the received signal; a phase modulating circuit for applying the alternating phase modulation to the carrier wave under the by the output of said frequency-dividing means; an $n$-phase phase-detecting circuit, where $n$ stands for the number of phases to be multiplexed and included in each frame of the time-division multiplexing; a discriminating regenerating circuit for recognizing the output of the $n$-phase phase-detecting circuit; an $n$-phase phase-modulating circuit in which the output of the phase modulating circuit is modulated under the control of the output of the discriminating regenerating circuit; and an output terminal.

8. A transmission system for transmitting information emanating from a plurality of information channels comprising:

a. phase difference modulation means coupled to said information channels for separately phase modulating a carrier in accordance with the information in each of said channels, b. means for time division multiplexing the phase difference modulated signals into a series of time frames, and c. means for phase difference modulating said multiplexed signals in a stepwise manner at an interval to provide a once per time frame stepwise phase shift of said multiplexed signals to thereby provide a duplicative phase modulated time division multiplex carrier signal.

9. The transmission system of claim 8, wherein said multiplexing means includes means for producing time division multiplexed signals at a repetition frequency M times the repetition frequency of the signals in said information channels, wherein M designates the number of channels carrying information.

10. The transmission system of claim 8, wherein said channel signal phase difference modulating means comprises a plurality of $n$-phase, phase modulators and associated logic circuits for causing the phase modulators to perform the phase difference modulation, said stepwise phase shifting means comprising means for providing a $\pi/n$ stepwise phase shift to said multiplexed signals at a time interval corresponding to the length of the time frame, $n$ corresponding to number of phases which the multiplexed signal can assume during each time frame.

11. The transmission system of claim 9 further including a differential detecting type receiver comprising:

a. means for receiving said duplicative phase modulated carrier signal,
b. a delay circuit having a delay time equal to the length of a time frame coupled to said receiving means,
c. a phase detecting circuit receiving said received signal and the output of said delay means,
d. a channel separating circuit coupled to said phase detecting circuit, and
e. a clock signal extracting circuit for generating a clock signal having a repetition frequency corresponding to that of the information signals emanating from said information channels.

12. The transmission system of claim 11 wherein said clock signal extracting circuit comprises delay means for delaying said received signals the length of time equal to 1/M times the length of a time frame, phase difference detecting means responsive to said received signal and said delayed signal for generating output signals having a magnitude proportional to the phase difference between said received signal and said delayed signal, circuit means for rectifying said output signals and means for applying said rectified output signals to said channel separating circuit.

13. The transmission system of claim 12 wherein said rectifying circuit means comprises $\log_2 n$ rectifying circuits connected in a cascade arrangement.

14. The transmission system of claim 9 further including a coherent detection type receiver for receiving said duplicative phase modulated carrier signal, said coherent detection type receiver comprising:

a. an $n$-phase discrimination means including means for removing the $\pi/n$ phase modulation from said received carrier signal,
b. means responsive to the output of said phase discrimination means for separating the output signal from said discrimination means into a plurality of signals each of said signals having a fixed relationship to the signals in the plurality of information channels at the transmitter, and
c. means receiving each of said plurality of signals for comparing the phase of each of the signals with the phase of the same signal delayed for a time equal to a time frame to reconstruct the information signals emanating from said information channels at the transmitter.

15. The transmission system of claim 14 wherein said means for removing the $\pi/n$ phase modulation from the received duplicative phase modulated carrier signal includes a carrier wave extracting circuit and a stepwise $\pi/n$ phase modulation means for stepwise phase modulating the extracted carrier.

* * * * *

UNITED STATES PATENT OFFICE
CERTIFICATE OF CORRECTION

Patent No. 3,804,985 Dated April 16, 1974

Inventor(s) Yoshio Matsuo

It is certified that error appears in the above-identified patent and that said Letters Patent are hereby corrected as shown below:

In The Heading:

Assignee - delete "Nikkon" and insert -- Nippon --

In The Specification:

Column 1, line 36 - after "Japanese Patent" insert -- Publication --.

Column 3, line 3 - delete "Fig. 5" and insert -- Fig. 15 --
line 64 - delete "18 and 20" and insert -- 19 and 20 --

Column 4, line 61 - delete "1,0)," and insert -- (1,0), --

Column 5, line 22 - delete "$A_2$-$A_2$," and insert -- $A_3$-$A_2$, --
line 26 - delete "phase", first occurrence, and insert -- phases --
line 28 - delete "$\pi$-$\pi$/2," and insert -- $\pi$, -$\pi$/2, --

Column 7, line 44 - after "136" delete ";" and insert -- , --
line 54 - between "two" and "phase" insert -- - --

Column 13, line 51 - after "4T" delete ";"

Column 15, line 16 - after "diagram" "is" should be -- in --

Signed and sealed this 1st day of October 1974.

(SEAL)
Attest:

McCOY M. GIBSON JR.
Attesting Officer

C. MARSHALL DANN
Commissioner of Patents

UNITED STATES PATENT OFFICE

CERTIFICATE OF CORRECTION

Patent No. 3,804,985 Dated April 16, 1974

Inventor(s) Yoshio Matsuo

It is certified that error appears in the above-identified patent and that said Letters Patent are hereby corrected as shown below:

In The Specification:

Column 6, line 29 - "different" should be -- difference --

Column 12, line 21 - after "delay" insert -- time --

Column 14, line 29 - delete "$(a_{j-1}b_{j-1})$" and insert -- $(a_{j-1}b_{j-1}0)$ --

Column 15, line 15 - after "T" delete "iw" and insert -- is --

Column 15, line 17 - "to" should be inserted after "corresponds"

Column 15, line 44 - "receives" should be "receivers" --

Column 16, line 27 - comma should be inserted after "258" --

Column 17, line 3 - "discription" should be "description" --

Column 18, line 46 - "arrengement" should be "arrangement" --

Column 19, line 9 - "multplexing should be "multiplexing"

Column 20, line 44 - "control" should be inserted after "under the" --

Signed and sealed this 10th day of December 1974.

(SEAL)
Attest:

McCOY M. GIBSON JR.
Attesting Officer

C. MARSHALL DANN
Commissioner of Patents